United States Patent [19]

Tabuchi

[11] Patent Number: 4,885,793
[45] Date of Patent: Dec. 5, 1989

[54] DIGITAL SERVO SYSTEM USING MICROCOMPUTER FOR CONTROLLING PHASE AND SPEED OF ROTARY BODY

[75] Inventor: Junichiro Tabuchi, Daito, Japan

[73] Assignee: Sanyo Electric Co., Ltd., Japan

[21] Appl. No.: 153,060

[22] Filed: Feb. 8, 1988

[30] Foreign Application Priority Data

| Feb. 10, 1987 | [JP] | Japan | 62-29103 |
| Feb. 16, 1987 | [JP] | Japan | 62-32813 |
| Feb. 24, 1987 | [JP] | Japan | 62-42275 |
| Feb. 24, 1987 | [JP] | Japan | 62-42276 |
| Feb. 27, 1987 | [JP] | Japan | 62-45869 |
| Mar. 6, 1987 | [JP] | Japan | 62-52587 |

[51] Int. Cl.$^4$ .................................................. G05B 5/00
[52] U.S. Cl. ................................... 388/810; 388/912; 360/73.01
[58] Field of Search .................... 318/306–318, 318/326–327, 603, 636, 607, 608, 800, 802, 809–815, 820–829, 912; 360/69–71, 73.01

[56] References Cited

U.S. PATENT DOCUMENTS

| 4,297,733 | 10/1981 | Sanderson | 360/77 |
| 4,531,158 | 7/1985 | Murakami et al. | 358/227 |
| 4,536,806 | 8/1985 | Louth | 360/69 |
| 4,584,507 | 4/1986 | Taylor | 318/327 |
| 4,668,900 | 5/1987 | Tabuchi | 318/608 |

OTHER PUBLICATIONS

M. Endo et al, "VTR Control Circuit", Sanyo Technical Review, August 1985, Vol. 17, No. 2, pages 45–50.

Primary Examiner—William M. Shoop, Jr.
Assistant Examiner—David Martin
Attorney, Agent, or Firm—Peter L. Michaelson

[57] ABSTRACT

A microcomputer (20) servo controls the rotational speed and the rotational phase of a cylinder motor (37) of a VTR in a digital manner. The microcomputer (20) generates a 10-bit digital phase error signal $D_{PH}$ having sufficiently low conversion gain and a 10-bit digital speed error signal $D_{SP}$ having sufficiently low conversion gain in response to an FG signal generated with rotation of a cylinder motor. The digital phase error signal $D_{PH}$ and the digital speed error signal $D_{SP}$ are added to each other in a digital manner in the addition ratio 1:8. In addition, the result of this addition is amplified four times in a digital manner by extracting eight lower order bits thereof and then converted into an analogue signal and supplied to the cylinder motor as a servo control signal. Thus, since the error signals are added to each other in a digital manner and then, the added signal is amplified as required, a digital servo having a large capture range can be achieved as whole.

31 Claims, 19 Drawing Sheets

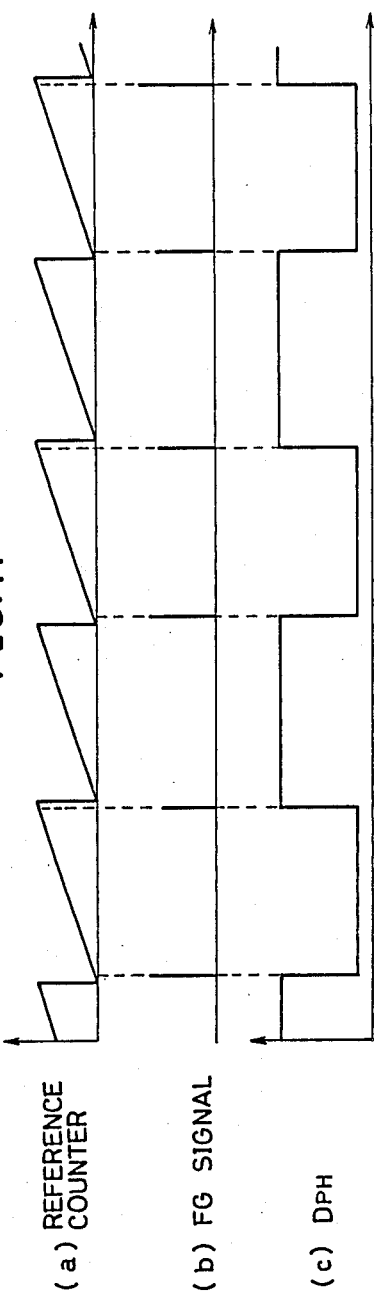
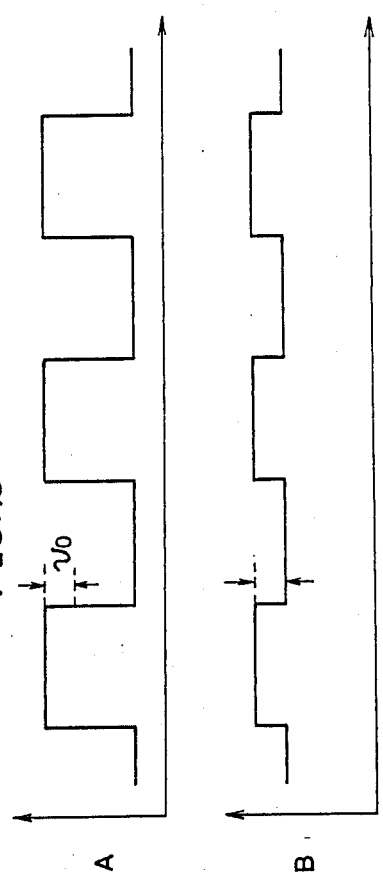
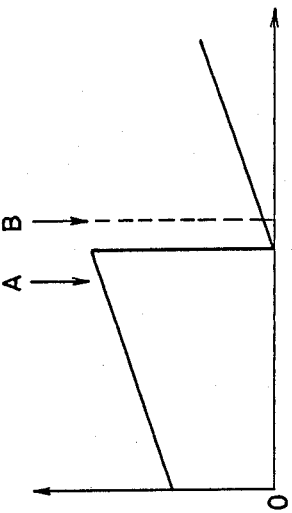

$T_0 + T_1 = T_2$

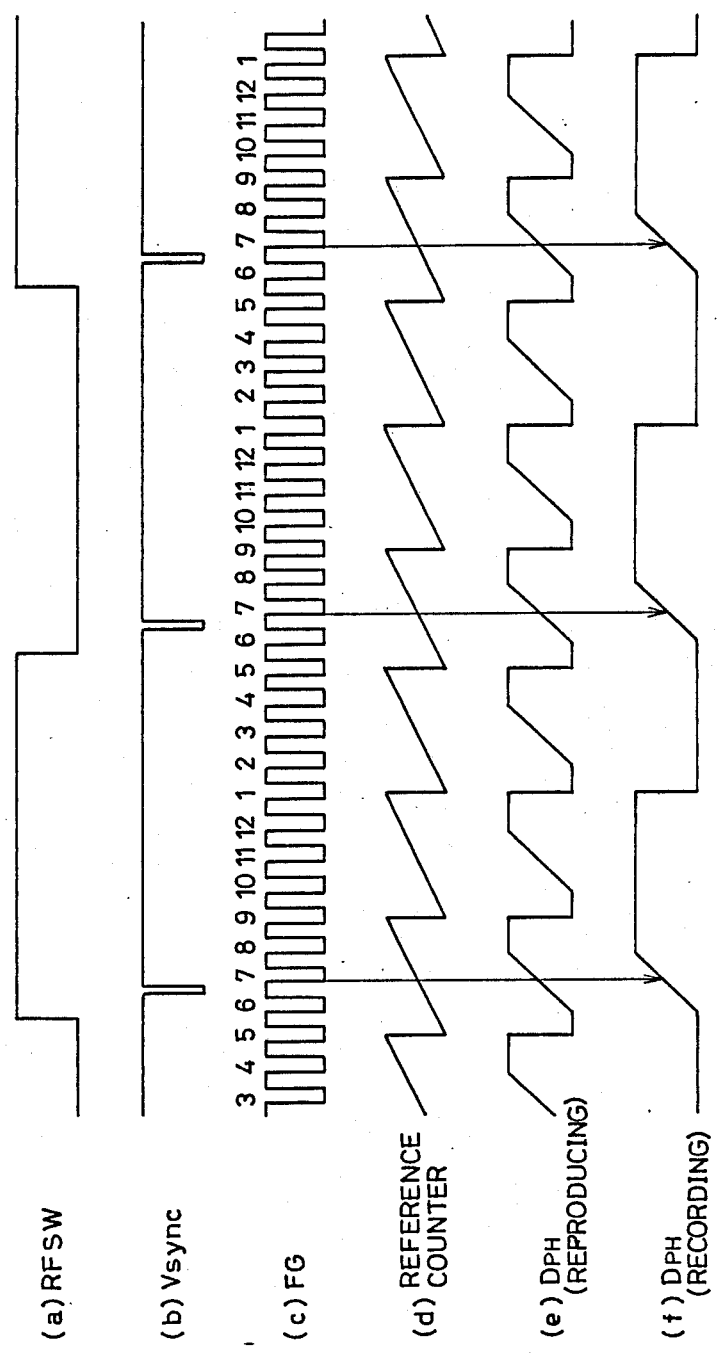

DIGITAL SERVO SYSTEM USING MICROCOMPUTER FOR CONTROLLING PHASE AND SPEED OF ROTARY BODY

BACKGROUND OF THE INVENTION

1. Field of the Invention

The present invention relates to a digital servo system and more particularly, to a digital servo system in which a servo system for controlling the phase and the speed of a rotary body such as a cylinder motor, a capstan motor in a video tape recorder (referred to as VTR hereinafter) is achieved using a microcomputer.

2. Description of the Prior Art

Conventionally, in a VTR, for example, in a two head helical scanning type VTR, there have been provided a cylinder motor for driving rotation of a rotary head and a capstan motor for driving traveling of a tape. At the time of operation of the VTR, the rotational phases and the rotational speeds of the above described cylinder motor and the capstan motor serving as driving means are servo controlled, so as to correctly control the speed and the phase of rotation of the rotary head and the phase and the speed of traveling of the tape.

More specifically, at the time of recording in the VTR, the rotational speeds of the cylinder motor and the capstan motor are controlled such that the rotational speeds of both the motors take a predetermined value, and the rotational phase of the cylinder motor is controlled such that the rotational phase of the rotary head and the phase of a vertical synchronizing signal in a video signal to be recorded have a predetermined phase relation. In addition, the rotational phase of the capstan motor is controlled such that the rotational speed of the capstan motor is held at the above described predetermined value with accuracy.

On the other hand, at the time of reproduction in the VTR, the rotational speeds of the cylinder motor and the capstan motor are controlled such that the rotational speeds of both the motors take a predetermined value, and the rotational phase of the cylinder motor is controlled such that the rotational phase of the rotary head and the phase of a predetermined reference signal have a predetermined phase relation. In addition, the rotational phase of the capstan motor is also controlled for correct tracking.

A servo control system for the above described control is divided into an analogue system and a digital system. The analogue servo system has a simple circuit structure. However, the system is liable to be affected by, for example, the change of a power-supply voltage, the change of temperature and the change with time, so that stable operation cannot be ensured.

On the other hand, in a digital servo system comprising a counter and the like and utilizing a clock signal, the above described disadvantages are eliminated. In particular, since considerable progress has been made in the digital integrated circuit technique, such a digital servo system is utilized more often. As an example, a digital servo system using a microcomputer is disclosed in, for example, U.S. Pat. Nos. 4,584,507 and 4,668,900.

FIG. 1 is a schematic block diagram showing a part of a digital servo system for a cylinder motor, which comprises an IC (LC7415) developed for such a digital servo control. Referring to FIG. 1, an IC 1 comprises a circuit 2 responsive to a detection signal from a cylinder motor (not shown) for generating a phase error signal of the cylinder motor, a circuit 3 also responsive to a detection signal for generating a speed error signal, D/A converters 4 and 5 and amplifiers 6 and 7. The phase error signal generated in the circuit 2 is converted into an analogue signal by the D/A converter 4 and the analogue signal is amplified by the amplifier 6 and then, outputted from the IC 1 to the exterior. In addition, the speed error signal generated in the circuit 3 is converted into an analogue signal by the D/A converter 5 and the analogue signal is amplified by the amplifier 7 and then, outputted from the IC 1 to the exterior. The analogue phase error signal and the analogue speed error signal outputted from the IC 1 are added to each other outside the IC 1 and the added signal is suitably amplified by an amplifier 8 and then, applied to a cylinder motor driving circuit (not shown) as a servo control signal. Such analogue addition of error signals performed outside a microcomputer is disclosed in an article by M. Endo et al., entitled "VTR Control Circuit", SANYO TECHNICAL REVIEW, VOL. 17, NO. 2, August 1985, pp. 45-50, Japanese Patent Laying-Open Gazette No. 190744/1986 and U.S. Pat. No. 4,536,806.

However, the digital servo system comprising the D/A converters 4 and 5 inside the IC 1 and performing analogue addition of the phase error signal and the speed error signal outside the IC 1 presents the following problems.

FIG. 2 is a diagram for explaining schematically the principle of, for example, generation of the phase error signal of the cylinder motor in the VTR. FIG. 2(a) shows a signal indicating the rotational phase of the cylinder motor actually detected and more particularly, a signal obtained by, for example, frequency-dividing 24 FG Frequency Generator) pulses generated per one rotation of the cylinder motor into $\frac{1}{2}$. In FIG. 2(a), a waveform represented by a solid line shows a signal obtained by frequency-dividing into $\frac{1}{2}$ the FG signal generated when the cylinder motor is rotated in a predetermined correct phase relation. In addition, a dotted line shows a case in which the rotational phase of the cylinder motor is slightly advanced from the correct rotational phase (represented by the solid line).

On the other hand, FIG. 2 (b) is a diagram for explaining the relation between the change of the rotational phase of the cylinder motor and the amplitude of the phase error signal generated in response to the change. The minimum voltage value and the maximum voltage value which the phase error signal supplied to a motor driving system can actually take are 0 V and a predetermined value (for example, 5 V), respectively. In addition, in the digital servo system, the amplitude of the phase error signal is represented by the number n of bits of the digital phase error signal, "0" corresponding to the above described minimum voltage value (0 V) and "$2^n-1$" corresponding to the above described maximum voltage value (5 V). Furthermore, in FIG. 2(b), a period "$T_{DP}$" when the amplitude takes the minimum value 0 is referred to as a "bias period" and a period "$T_{SP}$" when the amplitude changes from the minimum value 0 to the maximum value "$2^n-1$" is referred to a "clock range".

As can be seen from FIG. 2, if the cylinder motor is correctly rotated in a predetermined phase relation, the amplitude of the phase error signal is fixed at an almost intermediate point A between the minimum value 0 and the maximum value ($2^n-1$), so that servo control is performed in response to the phase error signal having an amplitude of about ($2^n-1$)/2. The servo control allows the above described predetermined phase relation to be maintained. This intermediate point A is referred to as a lock point hereinafter.

However, as represented by the dotted line in FIG. 2(a), when the rotational phase of the cylinder motor begins to be shifted in, for example, an advanced direction, the amplitude of the phase error signal is decreased from the above described lock point A to a point B in response to the shift. More specifically, a servo signal supplied to the cylinder motor driving system is decreased and force for restraining rotation of the motor is applied, so that the advanced phase (represented by the dotted line) is returned to a predetermined phase relation (represented by the solid line). Contrary to this, when the rotational phase of the cylinder motor is delayed from the predetermined phase relation, it is clear that the amplitude of the phase error signal is increased from the lock point A in response to the delay. Consequently, the servo signal supplied to the cylinder motor driving system is increased and force for increasing rotation of the motor is applied, so that the delayed phase is returned to the predetermined phase relation.

On the other hand, when the rotational phase of the motor is significantly advanced so that the phase shift goes out of the lock range $T_{SP}$ and comes within the bias period $T_{DP}$, the phase error signal becomes 0, whereby a digital servo is not operated. More specifically, once the rotational phase of the motor goes out of the lock range, active force for capturing the phase error signal up to the lock point A is not applied, so that the function of the servo system is stopped until the rotational phase of the motor is naturally delayed so that the phase shift comes within the lock range $T_{SP}$.

The range of the lock range $T_{SP}$ a problem. The range of the lock range $T_{SP}$ is determined by the number n of bits of the phase error signal. More specifically, the range is determined absolutely by the period of a clock signal which defines the minimum resolution in the direction of the time base and the number n of output bits. For example when the period of the clock signal is 1 μsec. and the number n of bits equals 10, the lock range $T_{SP}$ is 1 μsec.$\times(2^{10}-(1)=1023$ μsec. In consideration of the resolution in the direction of the time base, the frequency of the clock signal cannot be decreased, that is, the period thereof cannot be increased. Thus, in order to increase the lock range $T_{SP}$, the number n of output bits must be increased. More specifically, if a constant amplitude (for example, 5 V) of the phase error signal is predetermined in the digital servo system, the increment of the amplitude per one clock period is decreased when the number n of bits of the phase error signal is increased. As represented by the dotted line in FIG. 2(b), a value (referred to as conversion gain hereinafter) indicating inclination of the slope in the lock range, that is, the magnitude of the error signal relative to the change of the rotational phase is decreased, so that the lock range $T_{SP}$ is increased. When the lock range $T_{SP}$ is increased, the range in which servo operation can be performed relative to the phase shift, that is, the range (referred to as capture range hereinafter) indicating what phase shift is captured up to the above described lock point is increased. On the other hand, if the number of bits of the phase signal is small, the lock range $T_{SP}$ is decreased, so that it is clear that the above described capture range is decreased. Furthermore, the foregoing description is also applied to control of the rotational speed of the cylinder motor.

Returning to the description of the digital servo system shown in FIG. 1, the error signals generated in the circuits 2 and 3 are converted into analogue signals by the D/A converters 4 and 5, respectively, and then the signals are added to each other. Thus, the number of bits of each of the error signals is limited to the number of bits which can be converted by the D/A converters 4 and 5. For example, when a D/A converter of an R-2R type is employed, cost is increased if the number of bits is increased. When a D/A converter by pulse width modulation (PWM) is employed, the period of the output signal is increased if the number of bits is increased. Consequently, the time constant of a filter for smoothing becomes large, so that servo control is liable to be affected. More specifically, in the conventional digital servo system for performing analogue addition of the error signals outside the IC as shown in FIG. 1, since the number n of bits of the error signal cannot be increased, the lock range $T_{SP}$ cannot be increased, so that conversion gain thereof is increased. As a result, the error signal is considerably changed by a slight phase shift, so that servo control is released. More specifically, in the conventional digital servo system, the capture range of the digital servo system is decreased, so that the motor can not be correctly servo controlled. In contrast to the conventional digital servo system for performing analogue addition of the error signals, a digital servo system for adding in a digital manner a speed error signal and a tracking error signal within a microcomputer is proposed, which is disclosed in, for example, Japanese Patent Laying-Open Gazettes Nos. 162855/1986 and 172245/1986. However, these systems fail to describe the above described problem of conversion gain of the error signals.

Meanwhile, in the servo system for the cylinder motor in the two head helical scanning type VTR, at the time of reproduction, the rotational phase of the cylinder motor is controlled such that the rotational phase of the rotary head is synchronized with the applied reference signal as described above. On the other hand, at the time of recording, the rotational phase of the cylinder motor is controlled such that the rotational phase of the rotary head and the vertical synchronizing signal in the video signal to be recorded have a predetermined phase relation. An example of such phase control is disclosed in, for example, Japanese Patent Laying-Open Gazette No. 136090/1981. The predetermined phase relation is generally determined by a standard. According to a standard of an NTSC (National Television System Committee) system concerning 8 mm VTR, control must be performed such that the phase difference between an edge of a head switching signal (RFSW) associated with the rotational phase of a head and the vertical synchronizing signal in the video signal to be recorded is 6H±1.5H (H:one horizontal scanning period). Such a phase difference is generally determined within every VTR. In particular, an apparatus for automatically adjusting such a phase difference is proposed, which is disclosed in, for example, Japanese Patent Publication No. 4449/1977.

However, since such an automatic phase adjusting apparatus is adapted such that the phases of a reference signal whose phase is adjusted to coincide with a particular phase of a composite synchronizing signal and a rotary pulse obtained from the cylinder motor are compared with each other, the structure is very complicated.

On the other hand, in the digital servo system, in order to improve performance of a rotational phase servo system of the motor, the sampling frequency of servo control must be set high. This is because if the sampling frequency is low, it becomes difficult to perform servo control quickly in response to a disturbance which may be caused. More specifically, in order to increase the sampling frequency of the digital servo control, an internal phase reference signal having a higher frequency than that of the vertical synchronizing signal in the video signal to be recorded (having a period of one-i-th (i:an integer)) and synchronized with the vertical synchronizing signal must be generated so that servo control is performed in response to the internal reference signal. In the digital servo system, the clock signal which provides a basis for operation of the system is generally generated by utilizing the frequency of a color subcarrier of the video signal to be recorded. However, in particular, if and when it is desired to achieve the digital servo system using a microcomputer, the color subcarrier having a high frequency of the video signal may not be utilized as it is, because the clock frequency of the microcomputer has a predetermined upper limit. In the digital servo system using the microcomputer, a phase reference signal synchronized with the vertical synchronizing signal and having a period of one-i-th must be generated as an internal reference signal for servo control, irrespective of the frequency of the color subcarrier of the video signal.

Additionally, the VTR comprises several kinds of modes of special reproduction such as still reproduction, slow reproduction and high-speed reproduction, in addition to a normal reproduction mode. In the special reproduction modes, the relative speed between the rotary head and a magnetic tape is different from the relative speed at the time of recording. Consequently, in the special reproduction modes, control is achieved such that the rotational speed of the rotary head is slightly changed depending on the modes. Such control is disclosed in Japanese Utility Model Publication No. 6905/1985.

Meanwhile, in order to change the rotational speed of the rotary head as described above, a constant of a rotational speed control system of the cylinder motor in the digital servo system, that is, a speed bias period and the frequency of the phase reference signal must be changed. However, even if the constant and the frequency are rapidly changed, the number of rotations of the cylinder motor cannot be rapidly changed, so that a phase servo for the cylinder motor is unlocked until the cylinder motor attains a predetermined rotational speed after the mode is changed. When the rotary head attains a predetermined rotational speed and again enters a phase locked state, the rotational speed of the cylinder motor may be temporarily changed considerably by the phase error signal supplied to the cylinder motor driving system. Such a large change of the rotational speed of the cylinder motor causes rolling of a reproduced image and release of color synchronization. Consequently, a digital servo system is required in which the rotational speed of the cylinder motor can be changed with the rotational phase being always locked.

On the other hand, in a special state, various characteristics may be improved if servo control of the rotational phase of the cylinder motor is released. For example, in the helical scanning type VTR, only the rotational speed of the cylinder motor is controlled and control of the rotational phase is released in an intermittent slow reproduction mode in which the tape is intermittently moved so that still reproduction and normal reproduction are alternately repeated, for the following reason. More specifically, since in the still reproduction and the normal reproduction, the relative speeds between the rotary head and the magnetic tape are changed, so that the periods of horizontal synchronizing signals to be reproduced are different from each other, there occurs rolling of a reproduced image when the video signal is reproduced as it is in an intermittent slow reproduction mode. In order to prevent the rolling, in the intermittent slow reproduction mode, phase control is released, while the rotational speed of the cylinder motor is increased and decreased to coincide with the speeds in a still reproduction state and a normal reproduction state.

In the case of the transition from a state in which phase control is performed (normal reproduction mode) to a state in which phase control is released (intermittent slow reproduction mode) and the reverse transition, there occurs the following problem. More specifically, the problem is how to set the phase error signal to be supplied to the cylinder motor driving system when the mode is changed between the normal reproduction mode and the intermittent slow reproduction mode.

Conventionally, similarly to a control method at the time of starting a motor which is disclosed in Japanese Utility Model Publication No. 40650/1984 and Japanese Patent Laying-Open Gazettes Nos. 202358/1986 and 212179/1986, a signal at a predetermined level is applied to the cylinder motor driving system as a phase error signal during a period of releasing phase control of the cylinder motor.

However, according to the conventional method, discontinuing of the phase error signal occurs when the mode is changed between the normal reproduction mode and the intermittent slow reproduction mode and much time is required until the phase is locked after the mode is changed, so that color synchronization of a video circuit is released. More specifically, in the conventional structure in which a signal at a predetermined level is only applied as a phase error signal when phase control is released, the phase error signal becomes discontinuous if the transition from the phase controlled state to the phase control released state, so that the cylinder motor is irregularly rotated. On the other hand, in the case of the transition from the phase control released state to the phase controlled state, about two to three seconds are required until the phase is locked, so that color synchronization may be released and the reproduced image may be very unclear.

SUMMARY OF THE INVENTION

Therefore, a primary object of the present invention is to provide a digital servo system having a large capture range, in which stable servo control is achieved relative to irregular rotation of a rotary body.

Another object of the present invention is to provide a digital servo system in which a correct internal reference signal for servo control of the rotational phase of the rotary body can be generated.

Still another object of the present invention is to provide a digital servo system in which the irregularity of rotation of the rotary body can be prevented in a special control mode of the rotary body.

Briefly stated, in the digital servo system according to the present invention, a digital phase error signal and a digital speed error signal associated with the rotary body are added to each other in a digital manner with respective conversion gain being sufficiently low to generate a digital error signal. The digital error signal is amplified in a digital manner and then, supplied to driving means of the rotary body as a servo control signal.

In accordance with another aspect of the present invention, the digital servo system further comprises means for restraining the width of change of the digital phase error signal to a predetermined value when the difference between the digital error signals adjacent to each other in terms of time sequence exceeds a predetermined value.

In accordance with still another aspect of the present invention, microcomputer means for servo controlling the rotary body comprises means for generating an internal reference signal for phase control of the rotary body and means for controlling the internal reference signal generating means such that the internal reference signal has a predetermined period and/or a phase relation with respect to an external reference signal.

In accordance with still another aspect of the present invention, the digital servo system comprises means for setting the period of the internal reference signal to one-i-th (i:an integer) of the period of the external reference signal.

In accordance with still another aspect of the present invention, the digital servo system comprises means for controlling the internal reference signal generating means such that a detection signal associated with the phase of the rotary body and the external reference signal have a predetermined phase relation.

In accordance with still another aspect of the present invention, the digital servo system comprises means for holding the phase error signal immediately before release of phase control during a period of releasing phase control if a first mode for releasing phase control of the rotary body and controlling the rotational speed of the rotary body is designated, and means for reproducing the phase relation between the detection signal and the internal reference signal immediately before designation of the first mode immediately after the transition of the phase controlled state occurs in response to release of designation of the first mode.

In accordance with still another aspect of the present invention, the digital servo system comprises means for gradually changing a speed bias period of the speed error signal if a second mode for controlling the rotational speed of the rotary body while maintaining phase control of the rotary body, and means for gradually changing the period of the internal reference signal.

A principal advantage of the present invention is that, since a digital phase error signal and a digital speed error signal are added to each other with the respective conversion gain being sufficiently low and then, the added signal is amplified in a digital manner, a servo control signal having high conversion gain can be obtained while holding the capture range of the digital servo system wide.

Another advantage of the present invention is that a correct internal reference signal for servo control of the rotational phase of the rotary body can be generated since the internal reference signal generating means is controlled such that the internal reference signal has a predetermined period and/or a phase relation with respect to an external reference signal.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 11, 12 and 13 are waveform diagrams for explaining processing for restraining the width of change of the phase error signal;

FIGS. 20, 21 and 22 are waveform diagrams for explaining the principle of processing in the step "I" shown in FIG. 18;

DESCRIPTION OF THE PREFERRED EMBODIMENTS

Figure 1:
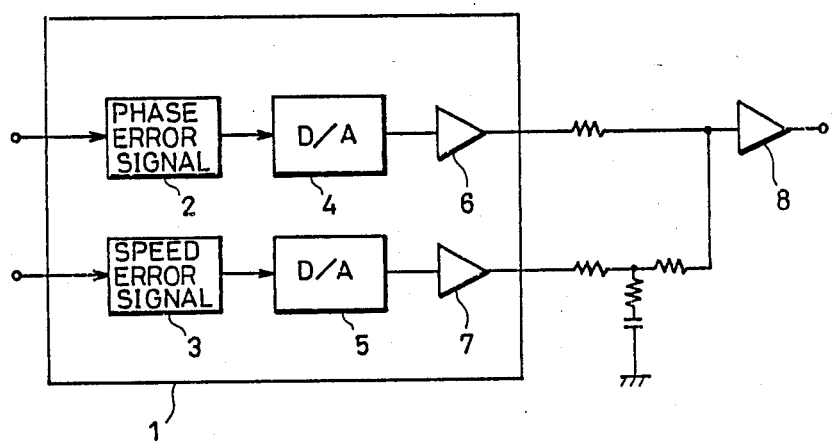
FIG. 1 is a schematic block diagram showing a conventional digital servo system for a cylinder motor using an IC.

Referring to the drawings, embodiments of the present invention will be described.

Figure 3:
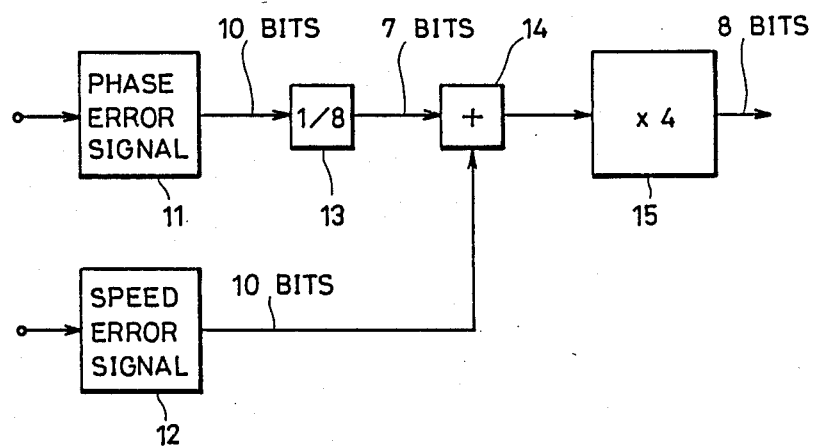
FIG. 3 is a schematic block diagram showing a digital servo system according to a first embodiment of the present invention.

A first embodiment of the present invention is directed to a digital servo system of a cylinder motor in a VTR. FIG. 3 is a block diagram for explaining schematically the principle thereof. Referring now to FIG. 3, description is made on the principle of the first embodiment of the present invention.

In FIG. 3, circuits 11 and 12 output a digital phase error signal (10 bits) and a digital speed error signal (10 bits) of a cylinder motor (not shown), respectively, in response to a detection signal from the cylinder motor, similarly to the circuits 2 and 3 shown in FIG. 1. The digital error signals are added to each other in a digital manner and then, the added signal is amplified in a digital manner, whereas the digital error signals are converted into analogue signals and the analogue signals are amplified and then added to each other in an analogue manner in the conventional circuit shown in FIG. 1. More specifically, after the 10-bit digital phase error signal outputted from the circuit 11 is shifted three bits by a circuit 13 so that seven higher order bits of the 10-bit digital phase error signal are extracted, that is, the 10-bit digital phase error signal is divided into ⅛, the divided digital phase error signal is added to the 10-bit digital speed error signal outputted from the circuit 12 by an adder 14. More specifically, the ratio of addition in the adder 14 is 1:8 (This ratio depends on a system). The result of this addition is amplified by four times in a digital manner by utilizing only eight lower order bits in a circuit 15 and outputted as a servo control signal.

Figure 2:
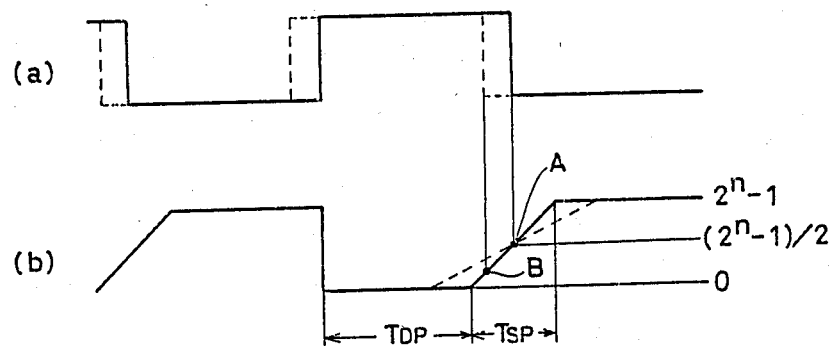
FIG. 2 is a diagram for explaining schematically the principle of generation of a phase error signal of the cylinder motor in a VTR.

As described with reference to FIGS. 1 and 2, a capture range of a servo system depends on conversion gain of error signals, that is, inclination of the slope of a lock range. The lower the conversion gain is, the more the lock range is increased, so that the capture range is increased. In the system shown in FIG. 3, since the phase error signal and the speed error signal are not amplified in a digital manner before addition thereof, the conversion gain of each of the error signals is low and the lock range of each of the error signals is large at the time of addition. Since the error signals are added to each other in a digital manner with the conversion gain being sufficiently low and then, the added signal is amplified as required, a digital servo system having a large capture range can be achieved as a whole. For example, it is assumed that the rotational phase of the cylinder motor is shifted. If the respective conversion gain are high before addition of the phase error signal and the speed error signal, the capture range of the phase error signal is small, so that the above described addition is performed without effective servo information included in the phase error signal. As a result, effective servo control of the cylinder motor cannot be achieved. On the other hand, in the system shown in FIG. 3, since the conversion gain are low and the capture range is sufficiently large before addition, effective servo information is included in the phase error signal even if the rotational phase is considerably shifted. Thus, an effective phase error signal is included in servo information after addition. As a result, effective digital servo control having a large capture range can be achieved.

Processing from generation of the phase error signal and the speed error signal to digital addition of both the error signals as shown in FIG. 3 can be achieved in a software manner using a one-chip microcomputer (for example, HD6305Z).

Figure 4:
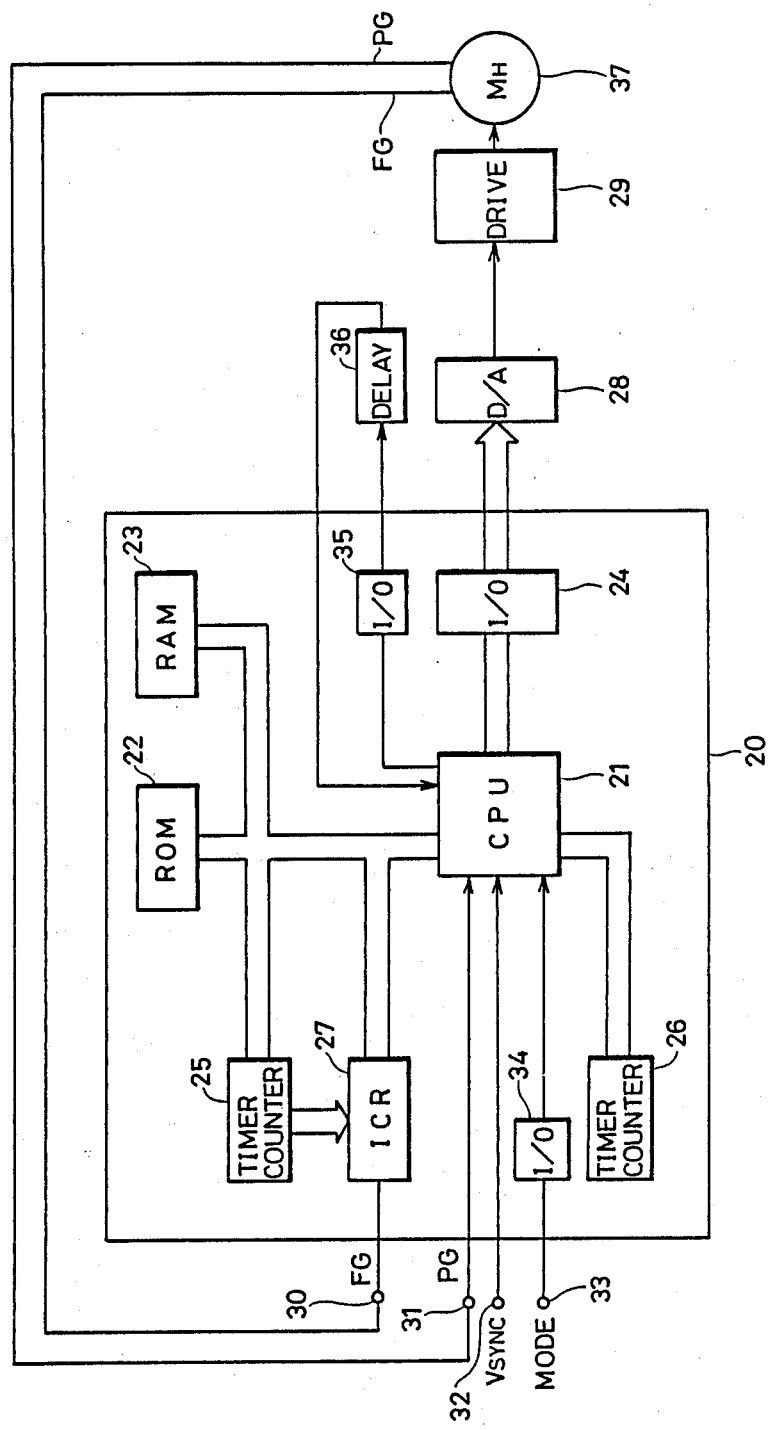
FIG. 4 is a block diagram showing a digital servo system comprising a microcomputer.

FIG. 4 is a block diagram showing a digital servo system comprising such a microcomputer. Referring to FIG. 4, a microcomputer 20 basically comprises a CPU 21, an ROM 22, an RAM 23, an input/output port 24, a first timer counter 25, a second timer counter 26 and an input capture register (ICR) 27. A digital servo control signal outputted from the input/output port 24 is converted into an analogue signal by a D/A converter 28 outside the microcomputer 20 and then, the analogue signal is applied to a driving circuit 29 for cylinder motor 37, so that rotation of the cylinder motor 37 is controlled. The D/A converter 28 may be provided inside the microcomputer 20. On the other hand, an FG signal and PG (Phase Generator) signal are generated in response to rotation of the cylinder motor. The FG signal includes 24FG pulses generated per one rotation of the cylinder motor as described above and the PG signal includes one PF pulse generated per one rotation of the cylinder motor. The generated FG signal is applied to the ICR 27 through an input capture interrupt terminal 30 of the microcomputer 20 and the generated PG signal is applied to the CPU 21 through a nonmaskable interrupt terminal 31. In addition, a vertical synchronizing signal VSYNC in a video signal is applied to the CPU 21 through a maskable interrupt terminal 32 of the microcomputer 20. Furthermore, a signal for designating an operation mode of the VTR is applied to the CPU 21 through a mode designating terminal 33 and an input/output port 34. The values of the timer counters 25 and 26 are changed in a period of 1 μsec. associated with a clock (4 MHz) of the microcomputer 20. The first timer counter 25 is related to an input capture interruption. In addition, when the counted value of the second timer counter (referred to as reference counter hereinafter) 26 attains a set numeric value, an interruption (counter matching interruption) occurs, so that the reference counter 26 is reset. Thus, the reference counter 26 can change the period of an overflow. In addition, at the time of recording, a predetermined value is preset in the reference counter 26 such that the counted value of the reference counter 26 and the vertical synchronizing signal in the video signal to be recorded have a predetermined relation, as described below.

Figure 5:
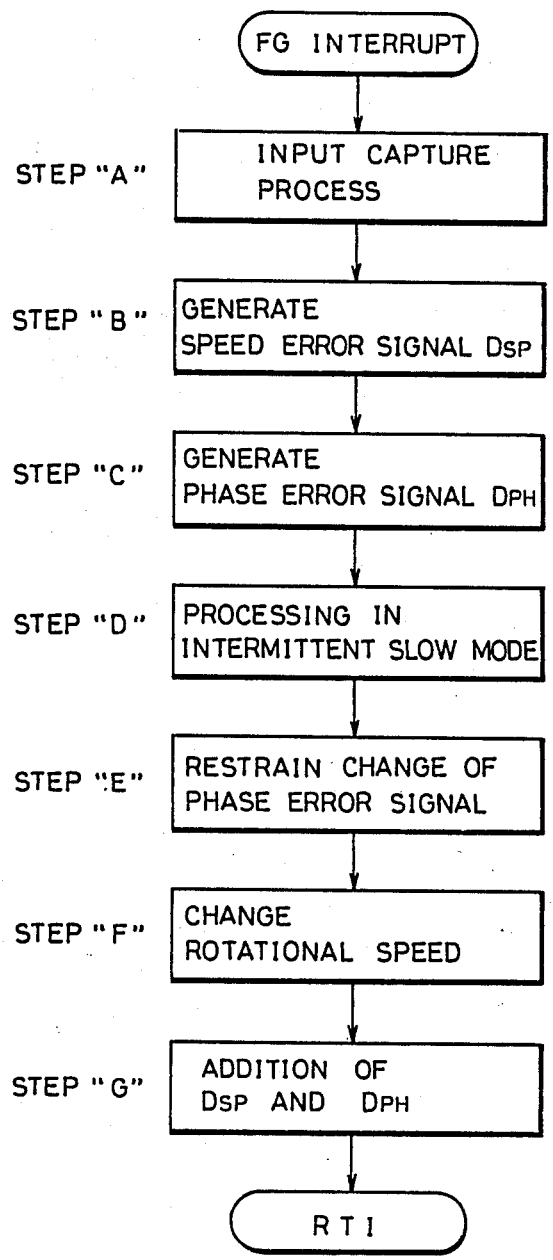
FIG. 5 is a flowchart showing an outline of FG interrupt processing according to the first embodiment of the present invention.

The microcomputer 20 is generally in an interrupt waiting state and is responsive to various signals for performing interrupt processing as described below. The first embodiment of the present invention relates to interrupt processing to be performed when the microcomputer 20 receives the FG signal from the cylinder motor 37, the interrupt processing comprising various processing from generation of the speed error signal and the phase error signal to digital combination of both the error signals as described above. FIG. 5 is a flowchart showing an outline of FG interrupt processing according to the first embodiment of the present invention. Referring now to FIG. 5, description is made on the outline of the FG interrupt processing.

When the FG signal applied to the input capture interrupt terminal 30 of the microcomputer 20 from the cylinder motor 37 falls, for example, an input capture processing occurs in the step "A". More specifically, the counted value of the first timer counter 25 at the falling time of the FG signal is stored in the ICR 27 provided independently of the RAM (register) 23. More specifically, since it cannot be determined what operation the microcomputer 20 is performing at the falling time of the FG signal, a phase difference cannot be measured with accuracy if the counted value is stored in, for example, the RAM 23 after an operation being executed by the microcomputer 20 is completed. Thus, the independent ICR 27 is provided such that the counted value of the timer counter 25 at the falling time of the FG signal is immediately stored.

When the operation being performed by the microcomputer 20 is completed at the falling time of the FG signal, substantial FG interrupt processing is started.

In the step "B", a digital speed error signal $D_{SP}$ for the cylinder motor is generated in response to the FG signal.

In the step "C", a digital phase error signal $D_{PH}$ for the cylinder motor is generated in response to the FG signal.

In the step "D", special control at the time of an intermittent slow reproduction mode is performed. More specifically, as described above, the conventional method presents various problems due to discontinuity of the phase error signal with regard to setting of the phase error signal at the time of transition between the normal reproduction mode and the intermittent slow reproduction mode. In this step "D", special processing is performed to solve such discontinuity of the phase error signal, as will be described in detail.

In the step "E", control is performed to restrain the change of the phase error signal, as will be described in detail.

In the step "F", special control is performed to change the rotational speed of the cylinder motor in a mode of special reproduction such as still reproduction, slow reproduction and high-speed reproduction. More specifically, as described above, in order to change the rotational speed of the cylinder motor, a constant of a rotational speed control system of the cylinder motor must be changed. However, the conventional method presents various problems due to unlocking of the phase. In this step "F", special processing is performed to change the rotational speed of the cylinder motor with the rotational phase being locked, as will be described in detail.

Finally, in the step "G", the speed error signal $D_{SP}$ and the phase error signal $D_{PH}$ are combined in a digital manner and the combined signal is outputted. Thereafter, the microcomputer 20 is returned to the original wait state. The foregoing is an outline of FG interrupt processing according to the first embodiment of the present invention.

Figure 6:
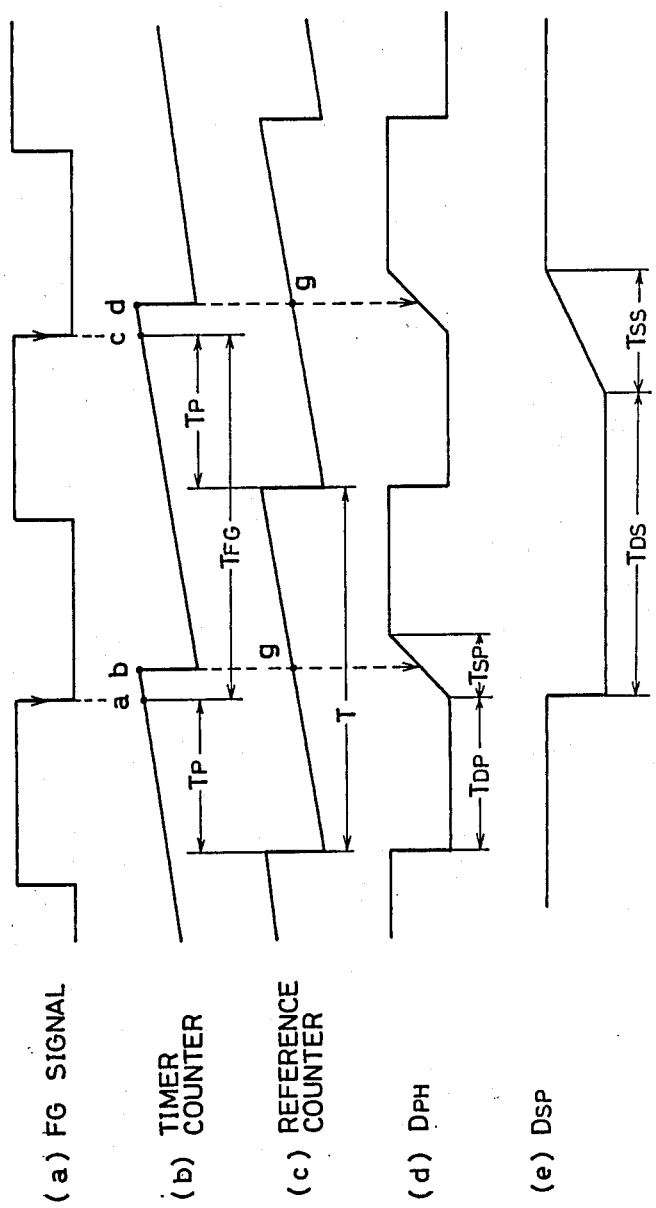
FIG. 6 is a waveform diagram for explaining generation of a digital speed error signal and a digital phase error signal of a cylinder motor.
Figure 7:
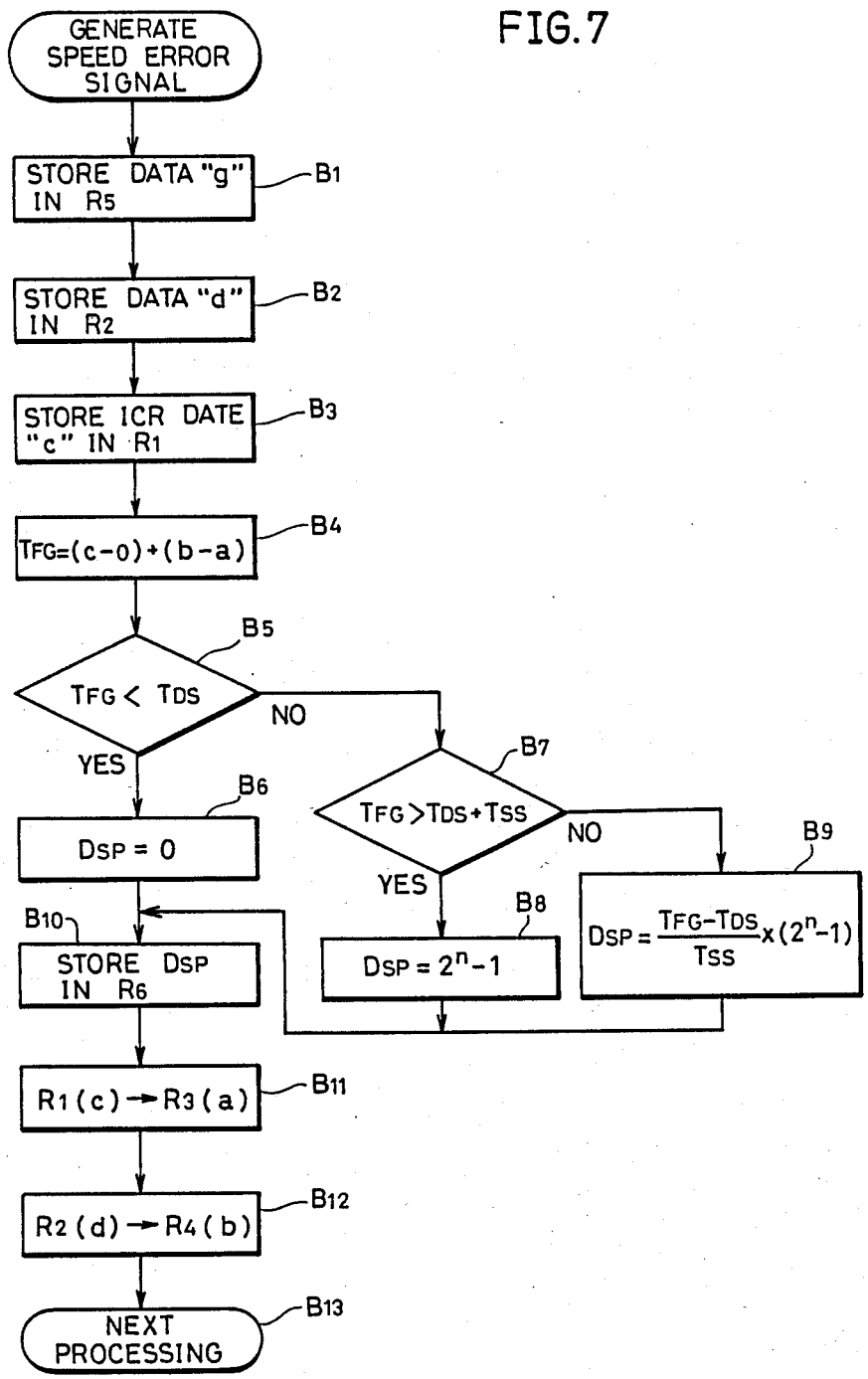
FIG. 7 is a flowchart for explaining generation of the digital speed error signal.

FIG. 6 is a waveform diagram for explaining generation of the digital speed error signal $D_{SP}$ and the digital phase error signal $D_{PH}$ of the cylinder motor shown in the steps "B" and "C" in FIG. 5, respectively. FIG. 7 is a flowchart showing generation of the speed error signal $D_{SP}$. Referring now to FIGS. 6 and 7, description is made on generation of the speed error signal $D_{SP}$ The speed error signal $D_{SP}$ is generated by measuring a period "$T_{FG}$" of the FG signal shown in FIG. 6(a) by the first timer counter 25. More specifically, one data is produced when the FG signal falls two times. FIG. 6 (b) is a diagram showing the counted value of the first timer counter 25, FIG. 6(c) is a diagram showing the counted value of the reference counter 26, FIG. 6(d) is a diagram showing the amplitude of the phase error signal $D_{PH}$ generated in response to the change of the rotational phase of the cylinder motor, FIG. 6(e) is a diagram showing the amplitude of the speed error signal $D_{SP}$ generated in response to the change of the rotational speed of the cylinder motor. Referring to FIG. 6, $T_{DP}$ and $T_{DS}$ represent bias periods and $T_{SP}$ and $T_{SS}$ represent lock ranges. As can be seen from FIG. 6, the period $T_{FG}$ of the FG signal is found by the following equation:

$$T_{FG} = (c-0) + (b-a) \quad (1)$$

In the step "A" shown in FIG. 5, a counted value c of the first timer counter 25 is stored in the input capture register 27 at the timing of the fall of the FG signal. In addition, when operation performed by the microcomputer 20 at the falling time of the FG signal is completed, the first timer counter 25 is reset, so that a counted value g of the reference counter 26 at that time is stored in a register R5 within the RAM 23 (in the step B1 shown in FIG. 7). The data g is used for generating the phase error signal as described below. Furthermore, a counted value d at the time of resetting the first timer counter 25 is stored in a register R2 within the RAM 23 (in the step B2). The data c stored in the input capture register 27 is then stored in a register R1 within the RAM 23 (in the step B3). Thereafter, an operation of the above described equation (1) is performed in the step B4 using data a and b obtained in the previous interrupt processing, so that the period TFG of the FG signal is obtained.

As can be seen from FIG. 6 (e), the amplitude of the speed error signal $D_{SP}$ is determined by the following equation in response to the speed bias period $T_{DS}$, the speed lock range $T_{SS}$ and data $T_{FG}$ indicating a FG period:

$$\text{When } T_{FG} < T_{DS}, D_{SP} = 0 \quad (2)$$

$$\text{When } T_{FG} > T_{DS} + T_{SS}, D_{SP} = 2^n - 1 \quad (3)$$

$$\text{When } T_{DS} + T_{SS} \geqq T_{FG} \geqq = T_{DS},$$
$$D_{SP} = (T_{FG} - T_{DS})/T_{SS} \times (2^n - 1) \quad (4)$$

Thus, in the step B5 shown in FIG. 7, the condition of the above described equation (2) is determined. If the condition is satisfied, it follows that the amplitude of the speed error signal is $D_{SP} = 0$ (in the step B6). In addition, if the above described condition is not satisfied, the program proceeds to the step B7, where the condition of the above described equation (3) is determined. If the condition is satisfied, it follows that the amplitude of the speed error signal is $D_{SP} = 2^n - 1$ (in the step B8). On the other hand, if the condition is not satisfied, it follows that the amplitude is $DSP = T_{FG} - T_{DS})/T_{SS} \times (2^n - 1)$ (in the step B9). The speed error signal $D_{SP}$ thus obtained is stored in a register R6 within the RAM 23 (in the step B10). In addition, the data c and d stored in the registers R1 and R2, respectively, are transferred to registers R3 and R4 within the RAM 23 to be used as data a and b in the next interrupt processing (in the steps B11 and B12). By the foregoing processing, generation of the speed error signal is completed and then, the program proceeds to the next processing (in the step B13).

Figure 8:
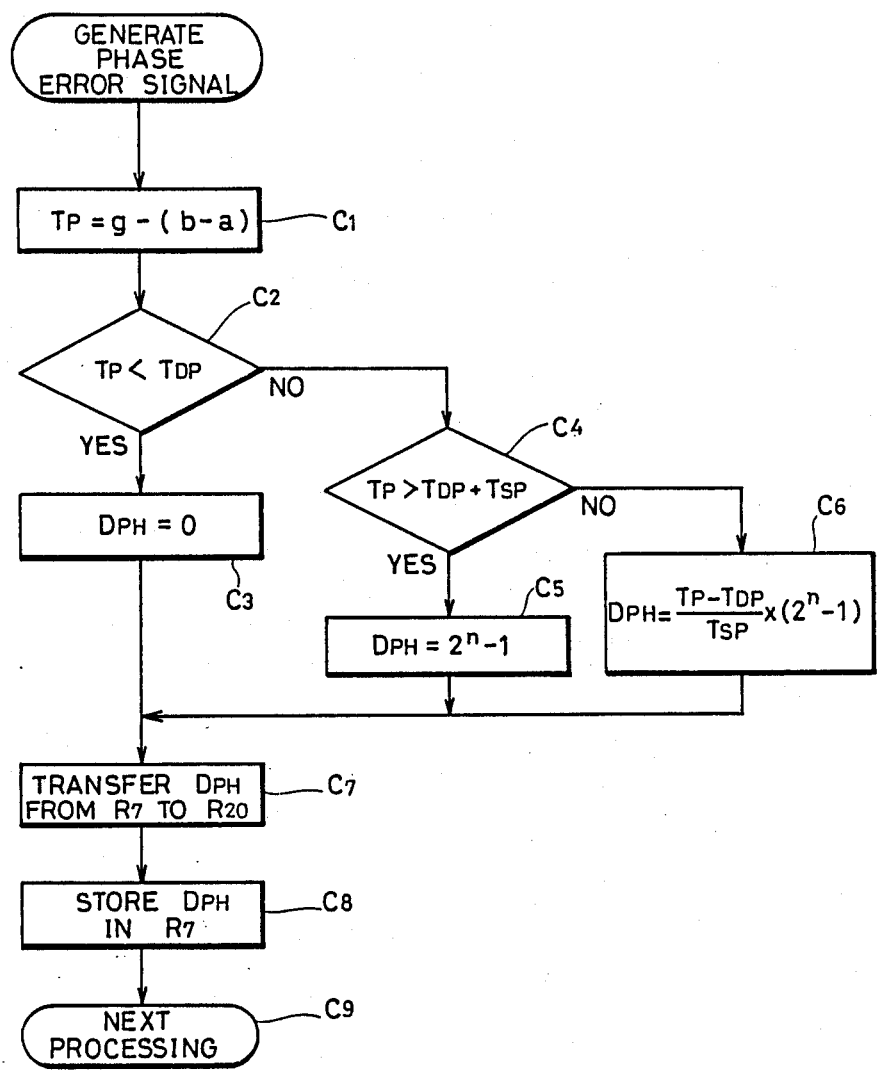
FIG. 8 is a flowchart for explaining generation of the digital phase error signal.

FIG. 8 is a flowchart for explaining generation of the phase error signal $D_{PH}$ shown in the step "C" in FIG. 5. Referring now to FIGS. 6 and 8, detailed description is made on generation of the phase error signal $D_{PH}$.

The phase error signal is generated in response to data $T_P$ indicating a phase difference between timing of a phase reference, that is, timing for resetting the reference counter 26 shown in FIG. 6 (c) and timing of the fall of the FG signal shown in FIG. 6(a). As can be seen from FIG. 6, the data $T_P$ indicating the phase difference can be found from the following equation:

$$T_p = g - (b - a) \quad (5)$$

Thus, an operation of the above described equation (5) is performed in the step C1 shown in FIG. 8 in response to the data a, b and g which have been already stored in the registers, so that the data $T_P$ indicating the phase difference is found.

As can be seen from FIG. 6 (d), the amplitude of the phase error signal $D_{PH}$ is determined by the following equation in response to a phase bias period $T_{DP}$, a phase lock range $T_{SP}$ and the data $T_P$ indicating the phase difference:

When $T_P < T_{DP}$, $D_{PH} = 0$                     (6)

When $T_p > T_{DP} + T_{SP}$, $D_{PH} = 2^n - 1$       (7)

When $T_{DP} + T_{SP} \geq T_P = \geq T_{DP}$,
$D_{PH} = (T_P - T_{DP})/T_{SP} \times (2^n - 1)$       (8)

Thus, in the step C2 in FIG. 8, the condition of the above described equation (6) is determined. If the condition is satisfied, it follows that the amplitude of the phase error signal is $D_{PH} = 0$ (in the step C3). In addition, if the above described condition is not satisfied, the program proceeds to the step C4, where the condition of the above described equation (7) is determined. If the condition is satisfied, it follows that the amplitude of the phase error signal is $D_{PH} = 2^n - 1$ (in the step C5). On the other hand, if the condition is not satisfied, it follows that the amplitude is $D_{PH} = (T_P - T_{DP})/T_{SP} \times (2^n - 1)$ (in the step C6).

The phase error signal obtained by the previous interrupt processing and stored in a register R7 within the RAM 23 is transferred to a register R20 in the RAM 23 and held therein (in the step C7). A phase error signal newly obtained is stored in the register R7 (in the step C8). By the foregoing processing, generation of the phase error signal is completed and then, the program proceeds to the next processing (in the step C9).

Description is now made on special phase control in the intermittent slow reproduction mode shown in the step "D" in FIG. 5. More specifically, conventionally, phase control of the cylinder motor has been released during a period of the intermittent slow reproduction mode so that a signal at a predetermined level is applied to a cylinder motor driving system. However, there occurs various problems due to discontinuity of the phase error signal at the time of changing the mode. Briefly stated of processing in the step "D", at the time of transition from a phase controlled state to a phase control released state, discontinuity of the phase error signal is prevented by maintaining the phase error signal immediately before the transition. In addition, the original phase relation between the phase reference and the FG signal in the phase controlled state is restored immediately after the transition from the phase control released state to the phase controlled state.

Figure 9:
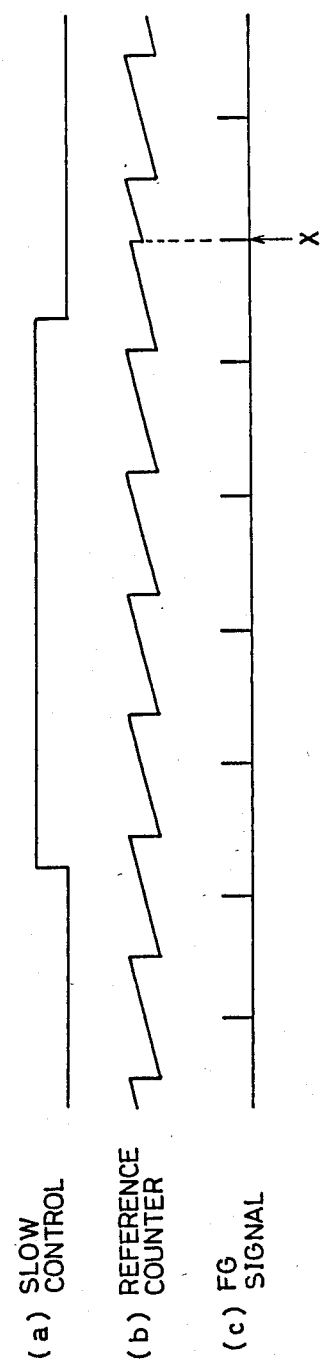
FIG. 9 is a waveform diagram for explaining processing in the step "D" shown in FIG. 5.
Figure 10:
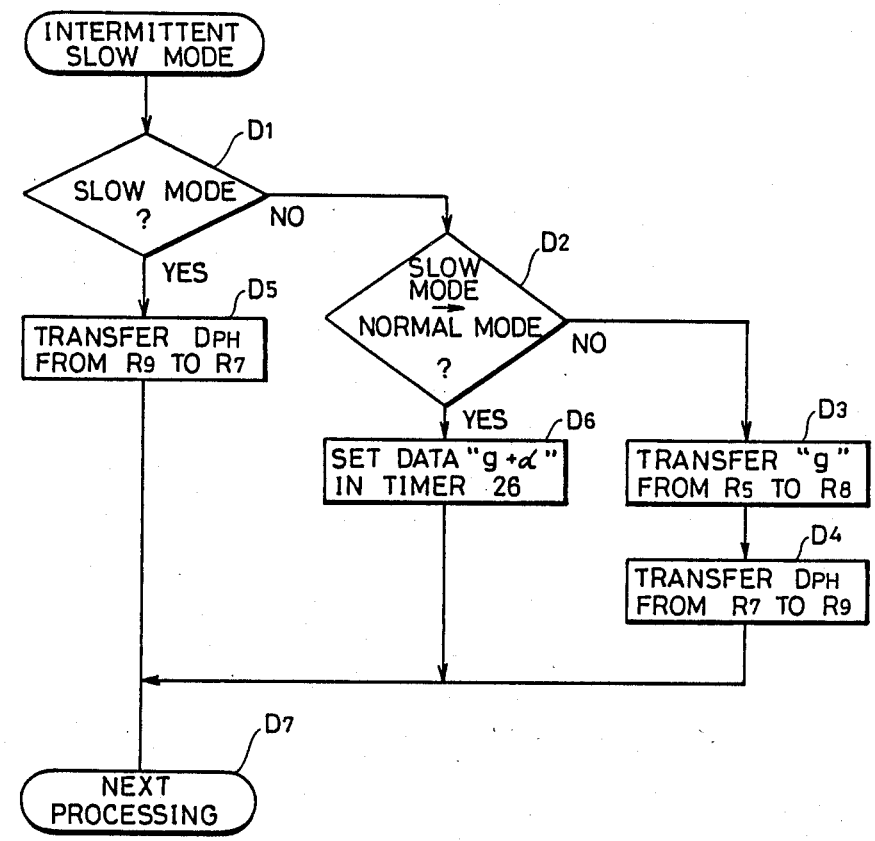
FIG. 10 is a flowchart for explaining in detail processing in the step "D" shown in FIG. 5.

FIG. 9 is a waveform diagram for explaining processing in the step "D", and FIG. 10 is a flowchart thereof. Referring now to FIGS. 4, 6, 9 and 10, detailed description is made on the processing in the step "D".

A slow control signal which attains an "H" level at the time of a slow reproduction mode as shown in FIG. 9(a) is applied to the CPU 21 through the mode designating terminal 33 shown in FIG. 4. In addition, FIG. 9(b) shows the counted value of the reference counter 26, and FIG. 9(c) shows timing of the fall of the FG signal. When an interruption of the FG signal occurs, the slow control signal is checked so that it is determined whether the mode thereof is in the slow reproduction mode, in the step D1 shown in FIG. 10. If the mode is not the slow reproduction mode, it is determined whether or not the mode is immediately after the transition from the slow reproduction mode to the normal reproduction mode, in the step D2. If and when it is determined that the mode is not immediately after the transition, that is, merely the normal reproduction mode, the data g stored in advance in the register R5 is transferred to a register R8 within the RAM and held therein (in the step D3) and the phase error signal $D_{PH}$ previously generated and stored in the register R7 is stored in a register R9 within the RAM 23 and held therein while maintaining the content in the register R7 as it is (in the step D4). Then, the program proceeds to the next processing (in the step D7).

On the other hand, if it is determined that the mode of the slow control signal is changed to the slow reproduction mode in the step D1 when an interruption of the FG signal occurs, the phase error signal $D_{PH}$ which has been held in the register R9 in the previous interruption (normal reproduction mode) is transferred to the register R7 (in the step D5), so that the phase error signal $D_{PH}$ is used as a phase error signal in the slow reproduction mode. Consequently, the phase error signal in the slow reproduction mode is the same as the phase error signal in the normal reproduction mode immediately before the slow reproduction mode, so that discontinuity of the phase error signal does not occur at the time of changing the mode.

Furthermore, if it is determined that the mode of the slow control signal is immediately after the transition from the slow reproduction mode to the normal reproduction mode in the step D2, when an interruption of the FG signal occurs, a value obtained by adding a fixed value $\alpha$ to the data g which has been held in the register R8 in the previous interruption (normal reproduction mode) is preset in the reference counter 26 (in the step D6) and then, the program proceeds to the next processing (in the step D7). More specifically, as can be seen from FIG. 9, data $(g + \alpha)$ is preset in the reference counter 26 at timing (represented by an arrow X) of the FG signal immediately after the change of the mode of the slow control signal to an "L" level and then, counting of the counter 26 is continued, so that the phase relation between the phase reference of the reference counter and the FG signal is the same as the phase relation in the normal reproduction mode before the transition to the slow reproduction mode. Thus, since phase control is resumed in the phase locked state, the cylinder motor is never irregularly rotated, unlike the foregoing. Since it is necessary to set a suitable value in advance in consideration of the increment of a counter during a period required for generating the error signal in the above described steps "B" and "C", the fixed value $\alpha$ is added to the data g.

Description is now made on processing for restraining the width of change of the phase error signal as shown in the step "E" in FIG. 5.

For example, FIG. 6 shows the state in which the phase of the cylinder motor is locked. However, in a transient state before the rotational phase is locked, for example, at the starting time of the cylinder motor, the FG signal may be inputted immediately before or after the reference counter 26 is reset. FIG. 11 is a waveform diagram showing the phase error signal in such a transient state. FIG. 11 (a) shows the counted value of the reference counter 26, FIG. 11(b) shows timing (FG pulse) for the fall of the FG signal, and FIG. 11(c) shows the phase error signal. As can be seen from FIG. 11, when the cycle of the FG signal is slightly changed, the difference between timing of the phase reference, that is, timing for resetting the reference counter 26 and timing of the FG pulse is small. However, data indicating the phase reference before and after resetting the counter are significantly different, so that phase error signals corresponding to the data are also significantly different. In such a state, a phase servo becomes unstable, so that the cylinder motor vibrates. Particular, when a brushless motor is used as the cylinder motor, a large current flows through the driving circuit 29 for the cylinder motor 37 and the power consumption in the driving circuit 29 is increased, so that heat is liable to be generated.

Additionally, as in the present embodiment, if the reference counter exists in the microcomputer, the above described problem occurs more easily. A counter in the microcomputer is generally reset or preset by interrupt processing. The interrupt processing is performed prior to another processing in the microcomputer if the counter comprises a cyclic phase reference counter. For example, FIG. 12 is a diagram showing counted values before and after resetting of the reference counter. Even if an FG pulse is generated at timing represented by an arrow A in FIG. 12, timing for latching the actual counted value of the reference counter is represented by an arrow B in FIG. 12 if the counter is reset or preset at the time point A. In addition, the counted value of the reference counter is latched at as exact timing as possible using interrupt processing by the FG pulse. However, when the microcomputer also performs another operation other than control of the cylinder motor, the time period from the time when the FG pulse is generated to the time when the FG interruption is detected is not 0. Thus, the FG pulse may be generated before the reference counter is reset and the FG interruption may be detected after the reference counter is reset. More specifically, in the digital servo system using the microcomputer, the above described rapid change of the phase error signal easily appears.

Figure 14:
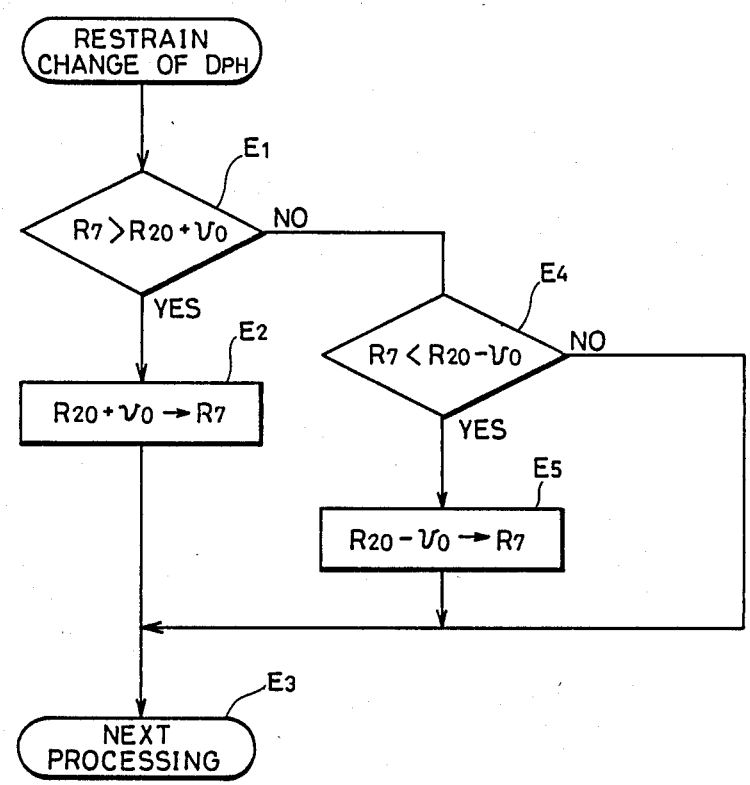
FIG. 14 is a flowchart for explaining in detail processing for restraining the width of change of the phase error signal.

The processing in the step "E" shown in FIG. 5 is performed for controlling such a rapid change of the phase error signal. FIG. 13 is a waveform diagram for explaining such processing in the step "E", and FIG. 14 is a flowchart thereof. Referring now to FIGS. 13 and 14, the processing in the step "E" is described in detail. A value of the present phase error signal $D_{PH}$ stored in the register R7 and a value obtained by adding a fixed value $v_0$ to a value of the phase error signal $D_{PH}$ in the previous FG interruption held in the register R20 in the above described step C7 are compared with each other in the step E1. If the present phase error signal stored in the register R7 is larger, a value obtained by adding the fixed value $v_0$ to the value of the register R20 is stored in the register R7 (in the step E2). Then, the program proceeds to the next processing (in the step E3). On the other hand, if both are equal or the value of the register R7 is smaller, the value of the register R7 and a value obtained by subtracting the fixed value $v_0$ from the value of the register R20 are compared with each other in the step E4. As a result, if the value of the register R7 is smaller, a value obtained by subtracting the fixed value $v_0$ from the value of the register R20 is stored in the register R7 (in the step E5) and then, the program proceeds to the next processing (in the step E3). If both are equal or the value of the register 7 is larger, the phase error signal stored in the register R7 is not changed and then, the program proceeds to the next processing (in the step E3). More specifically, as shown in FIG. 13A, if the difference between phase error signals adjacent to each other in terms of time sequence exceeds the fixed value $v_0$, the change of the phase error signal is restrained at the fixed value $v_0$. The fixed value $v_0$ is determined in consideration of the characteristic of the cylinder motor and the capture characteristic of a phase servo system. If the fixed value $v_0$ is too large, the restraint effect is reduced. On the other hand, if the fixed value $v_0$ is too small, the change of the phase error signal is significantly restrained, so that a long time period is required for capturing in the phase servo system.

Thus, according to the processing in the step "E", a rapid change of the phase error signal in a transient period elapsed until the rotational phase of the motor locked is restrained, so that irregularity of the phase servo system can be avoided.

Description is now made on control for the change of the rotational speed of the cylinder motor in the mode of special reproduction such as still reproduction, slow reproduction and high-speed reproduction shown in the step "F" in FIG. 5. More specifically, conventionally, a constant of the rotational speed control system of the cylinder motor was changed so as to control the rotational speed of the rotary head in the special reproduction mode, as described above. However, the phase servo is unlocked, so that there occur various problems. Basically, in order to change the set speed of the motor, the speed bias period and the reference phase period must be changed. Briefly stated of the processing in the step "F", the bias period of the speed error signal of the cylinder motor at the time of reproduction is gradually changed and the reference phase period is gradually changed related to the above described change.

Control of a capstan motor at the time of reproduction will be considered in the following. Since the phase is controlled using a tracking error signal, it is only necessary to change the bias period of the speed error signal so as to change the set speed in each mode. Such tracking error signal is disclosed in U.S. Pat. No. 4,297,733. In a microcomputer [not shown) for a digital servo of the capstan motor, a corresponding speed bias period is set in response to designation of the mode, and the speed bias period is changed immediately when the change of the reproduction mode is designated. Consequently, the rotational speed of the capstan motor is changed.

On the other hand, in response to the operation mode designating signal of the VTR applied to the CPU 21 through the mode designating terminal 33, the microcomputer 20 (in FIG. 4) for controlling the cylinder motor according to the present embodiment sets a speed bias period $T_{DSM}$ and a reference phase period $T_M$ of the reference counter 26 responsive to the designated operation mode. If the detected reproduction mode is different from the previously detected reproduction mode, a predetermined amount $\Delta T_{DS}$ of change of the speed bias and a predetermined amount $\Delta T$ of change of the reference period are set in response to the change of the mode. The speed bias $T_{DS}$ is changed, by the predetermined amount $T_{DS}$, every FG interruption, and the reference phase period T is changed, by the predetermined amount $\Delta T$, every time the counter matching interruption of the reference counter 26 occurs.

Description is now made on the change of the speed bias $T_{DS}$ due to the FG interruption. The change of the reference phase period T due to the counter matching interruption of the reference counter 26 will be described later.

Figure 15:
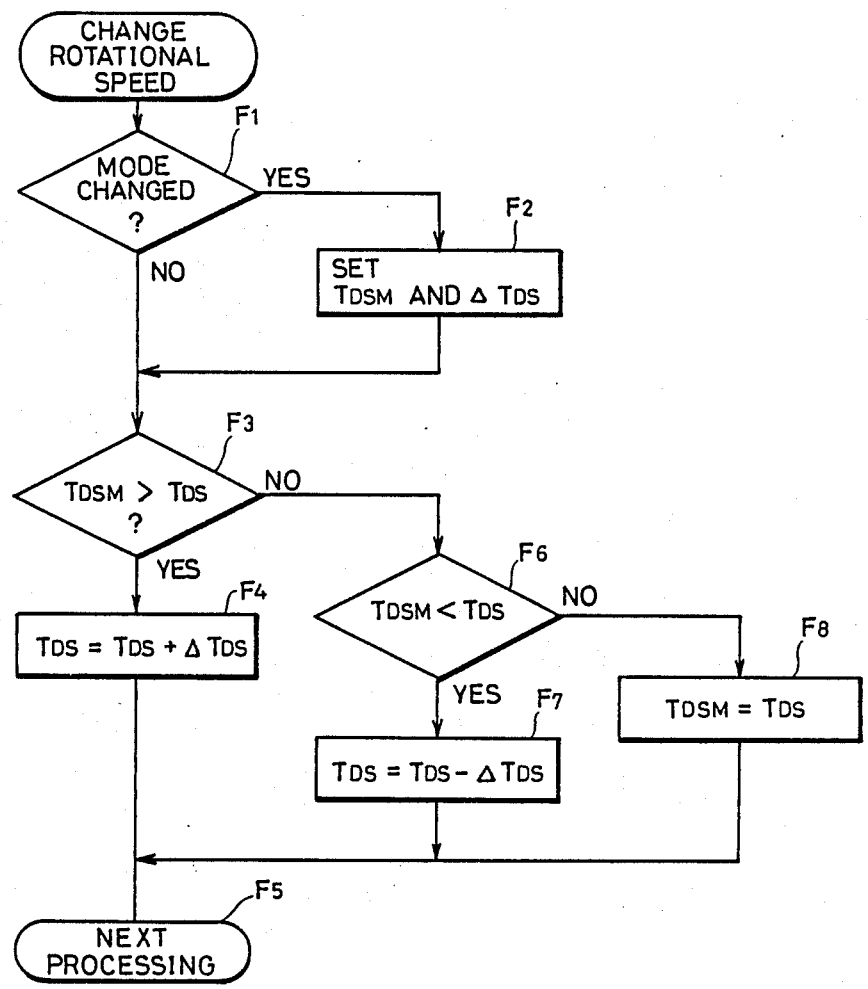
FIG. 15 is a flowchart showing processing for changing a speed bias period of the cylinder motor.

FIG. 15 is a flowchart showing processing for changing the speed bias $T_{DS}$ of the cylinder motor by the FG interruption in the step "F" shown in FIG. 5.

First, in the step F1, it is determined whether or not the operation mode of the VTR is changed. If it is determined that the mode is changed, the speed bias period $T_{DSM}$ corresponding to the changed mode and the predetermined amount $\Delta T_{DS}$ of change of the speed bias responsive to the change of the mode are set (in the step F2). The present speed bias period $T_{DS}$ and the set speed bias period $T_{DSM}$ are compared with each other (in the step F3) If the set value $T_{DSM}$ is larger, the speed bias $T_{DS}$ is increased by the predetermined amount $\Delta T_{DS}$ of change (in the step F4) and then, the program proceeds to the next processing (in the step F5). On the other hand, if it is determined that the set value $T_{DSM}$ is smaller (in the step F6), the speed bias $T_{DS}$ is decreased by the predetermined amount $\Delta T_{DS}$ of change (in the step F7) and then, the program proceeds to the next processing (in the step F5). The speed bias is changed every FG interruption until the speed bias $T_{DS}$ coincides with the set value $T_{DSM}$. If both coincide with each other, increase or decrease by the amount $\Delta T_{DS}$ is not performed (in the step F8) and then, the program proceeds to the next processing (in the step F5).

Figure 16:
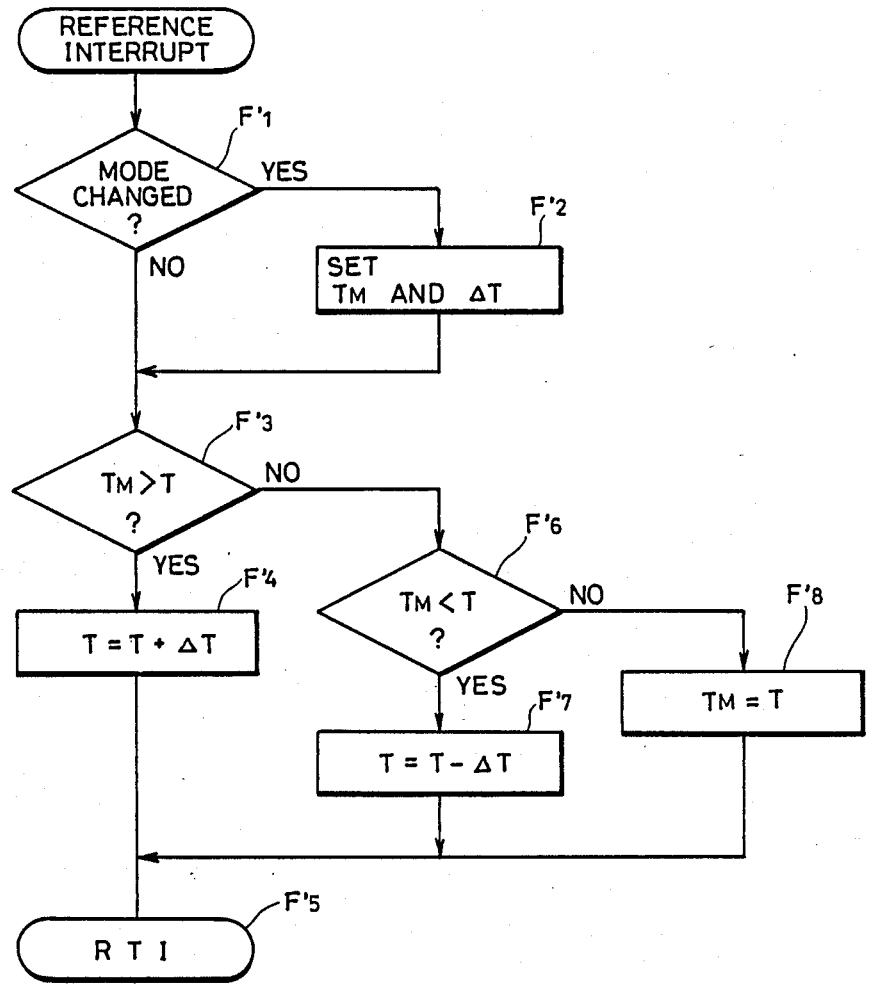
FIG. 16 is a flowchart showing processing for changing a reference phase period.

FIG. 16 is a flowchart showing processing for changing the reference phase period T by the above described counter matching interruption of the reference counter 26.

When the counter matching interruption of the reference counter 26 occurs, it is determined whether or not the operation mode of the VTR is changed in the step F'1. If it is determined that the mode is changed, the reference phase period $T_M$ corresponding to the changed mode and the predetermined amount $\Delta T$ of change of the reference phase period responsive to the change of the mode are set (in the step F'2). The present reference phase period T and the set reference phase period $T_M$ are then compared with each other (in the step F'3). If the set value $T_M$ is larger, the reference phase period T is increased by the predetermined amount $\Delta T$ of change (in the step F'4) and then, the microcomputer 20 is returned from the interruption (in the step F'5). On the other hand, if it is determined that the set value $T_M$ is smaller (in the step F'6), the reference phase period T is decreased by the predetermined amount $\Delta T$ of change (in the step F'7) and then, the microcomputer 20 is returned from interruption (in the step F'5). The reference phase period is changed every counter matching interruption until the reference phase period T coincides with the set value $T_M$. If both coincide with each other, increase or decrease by the amount $\Delta T$ is not performed (in the step F'8) and then, the microcomputer 20 is returned from the interruption (in the step F'5).

As described above, the amount $\Delta T_{DS}$ of change of the speed bias and the amount $\Delta T$ of change of the reference phase period are selected in the following manner. The change of mode of the capstan motor and the change of mode of the cylinder motor are almost simultaneously started. These changes are not particularly synchronized with each other. However, these changes are started in response to each interruption immediately after the change of mode is detected. Since both sampling frequencies of a speed servo and the phase servo of the cylinder motor are high such as 180 Hz, it may be considered that these changes are started substantially at the same time. In addition, if necessary, these changes may be synchronized with each other.

It is assumed that the time period required for changing the speed of the capstan motor is, for example, ten cycles of the above described sampling frequency. When the speed bias period $T_{DS}$ of the cylinder motor must be changed by 50 $\mu$sec. and the reference phase period T must be changed by 150 $\mu$sec., it is necessary that the amount $\Delta T_{DS}$ of change of the speed bias is set to 5 $\mu$sec. and the amount $\Delta T$ of change of the reference phase period is set to 15 $\mu$sec.

In general, it is necessary that the amount $\Delta T_{DS}$ of change of the speed bias and the amount $\Delta T$ of change of the reference phase period are set such that predetermined changes in the cylinder motor are achieved by repeating the changes of the above described amount $\Delta T_{DS}$ and the above described amount $\Delta T$ by the number of times of FG interruptions and counter matching interruptions of the reference counter which occur during the time period required for completing the change of speed of the capstan motor.

As described in the foregoing, since the speed bias period and the reference phase period of the cylinder motor are gradually changed, the rotational speed of the cylinder motor is changed with the rotational phase being locked, so that the cylinder motor is never irregularly rotated. In addition, the change of the rotational speed of the cylinder motor is almost synchronized with the change of mode of the capstan motor, so that rolling of a reproduced image and release of color synchronization are reduced.

Description is now made on combination of the digital speed error signal $D_{SP}$ and the digital phase error signal $D_{PH}$ according to the first embodiment of the present invention as shown in the step "G" in FIG. 5.

The principle of digital addition of the speed error signal and the phase error signal according to the first embodiment of the present invention has been already described schematically with reference to FIG. 3. More specifically, the generated 10-bit digital speed error signal and the 10-bit digital phase error signal are added to each other in the addition ratio 8:1 and then, the added signal is amplified by fourtimes in a digital manner and outputted as a servo control signal. This processing of amplifying the signal by four times in a digital manner is performed utilizing only eight lower order bits of the result of addition of the 10-bit signals. More specifically, the processing is performed as follows:

When two higher order bits <2 (in decimal notation)=10 (in binary notation), output DAD=0, When 2 (in decimal notation)=10 (in binary notation)≦two higher order bits<3 (in decimal notation)=11 (in binary notation), output DAD=8 lower order bits, and when two higher order bits≧=3 (in decimal notation)=11 (in binary notation), output DAD=$2^8-1$.

The 8-bit error signal is converted into an analogue signal by the D/A converter 28 (in FIG. 4) and applied to the driving circuit 29 for the cylinder motor 37 as a control voltage without through an amplifier outside the microcomputer.

Figure 17:
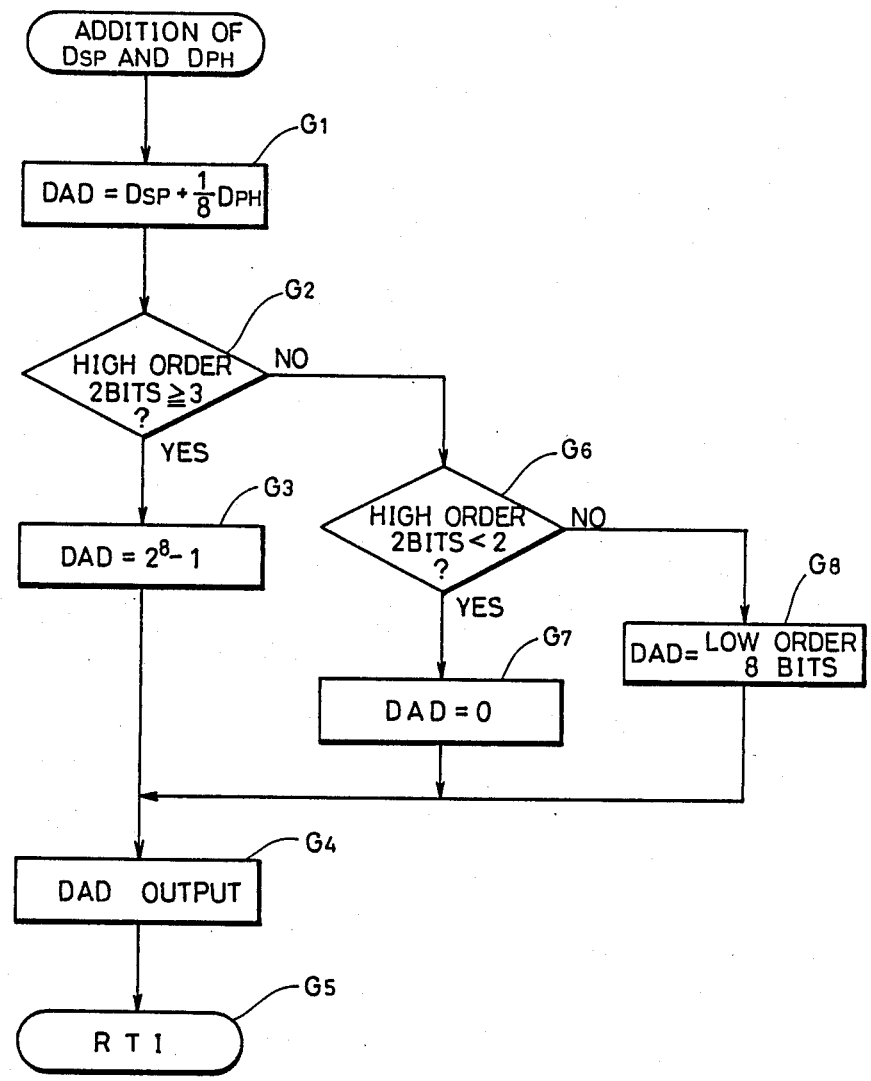
FIG. 17 is a flowchart showing combination of the digital phase error signal and the digital speed error signal followed by digital amplification.

FIG. 17 is a flowchart showing combination of the phase error signal and the speed error signal followed by digital amplification.

The 10-bit digital speed error signal $D_{SP}$ stored in the register R6 and a result obtained by dividing into ⅛ the 10-bit digital phase error signal $D_{PH}$ stored in the register R7 are added to each other, so that a 10-bit signal DAD is obtained (in the step G1). In the step G2, if it is determined that two higher order bits of the signal DAD is greater than or equal to 3 (in decimal notation), it follows that DAD=$2^8-1$ (in the step G3). The signal DAD is outputted from the microcomputer 20 as a control signal (in the step G4) and then, the microcomputer 20 is returned from the FG interruption (in the step G5). In the step G6, if it is determined that two higher order bits of the signal DAD is smaller than 2 (in decimal notation), it follows that DAD=0 (in the step G7). The signal DAD is outputted from the microcomputer 20 as a control signal (in the step G4) and then, the microcomputer 20 is returned from the FG interruption (in the step G5). On the other hand, when 2≦two higher order bits<3, it follows that DAD=eight lower order bits (in the step G8). The signal DAD is outputted from the microcomputer 20 as a control signal (in the step G4) and then, the microcomputer 20 is returned from the FG interruption (in the step G5).

The lock range of the 8-bit error signal DAD thus outputted was 256 μsec. so that a capture range of 5 to 6% was ensured by actual measurement. Contrary to this, if the conversion gain of the speed error signal before addition was increased and the lock range thereof was decreased to 256 μsec. and then, the speed error signals were added and the added signal was outputted with gain 1, only a capture range of 2 to 3% was ensured.

As described in the foregoing, according to the above described first embodiment, since the phase error signal and the speed error signal are added to each other with the respective conversion gain being sufficiently low and then, the added signal is amplified in a digital manner, a control output having high conversion gain can be obtained while holding the capture range of the servo system wide.

Figure 18:
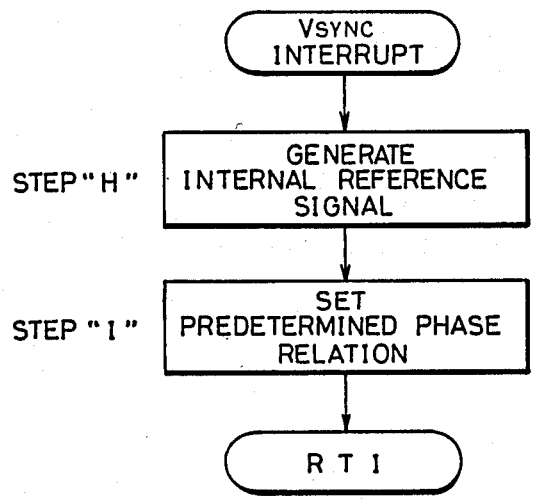
FIG. 18 is a flowchart for explaining schematically a second embodiment of the present invention.

Description is now made on a second embodiment of the present invention. FIG. 18 is a flowchart for explaining schematically the second embodiment of the present invention. The second embodiment is also achieved by the digital servo system comprising the microcomputer 20 shown in FIG. 4. Briefly stated, the second embodiment of the present invention is directed to interrupt processing to be performed when the microcomputer 20 of a digital servo system for a cylinder motor receives a vertical synchronizing signal in a video signal to be recorded, the interrupt processing comprising processing (in the step "H") for automatically setting the period of the reference counter 26 to generate a signal having a period which is one-i-th (i:an integer) of the period of the vertical synchronizing signal in the video signal to be recorded and synchronized with the vertical synchronizing signal as an internal reference signal for servo control of the cylinder motor and processing (in the step "I") for setting a phase difference between an edge of a head switching signal associated with the rotational phase of a head and the vertical synchronizing signal in the video signal to be recorded to 6H+1.5H (H:one horizontal scanning period).

Description is now made of the principle of the processing for automatically setting the period of the reference counter 26 in the step "H". As described above, the reference counter 26 is counted up once every four cycles of a clock (4 MHz) of the microcomputer 20. Thus, a value of the reference counter 26 is changed in a cycle of 1 μsec. The period of an overflow of the reference counter, that is, the period of a counter matching interruption can be changed by setting a particular numeric value in a software manner.

However, the period of the reference counter must be set to one-i-th of the period of the video signal to be recorded. Otherwise, reference phase periods do not coincide with each other in phase control to be performed in response to an FG signal and the value of the reference counter, so that the cylinder motor is irregularly rotated, whereby jitter becomes large.

More specifically, if a clock frequency of the microcomputer 20 is always correct, a numeric value set for the counter matching interruption might be a fixed value satisfying the above described condition of one-i-th of the period. However, in practice, there is an error of the clock frequency, so that it is difficult to set the numeric value to the fixed value. More specifically, if such an error occurs, the reference phase period is not one-i-th of the period of the vertical synchronizing signal, so that jitter occurs in the reference phase period. For the foregoing reason, an operation is required for always automatically setting the period of the reference counter 26 to one-i-th of the period of the inputted vertical synchronizing signal.

Figure 19:
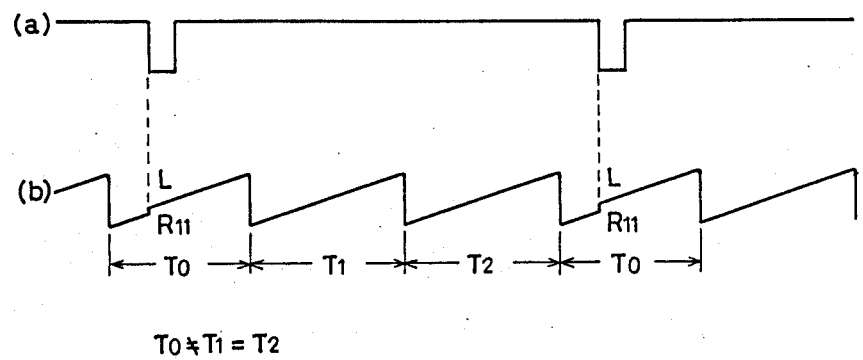
FIG. 19 is a waveform diagram showing the principle of processing in the step "H" shown in FIG. 18.

FIG. 19 is a waveform diagram for explaining the principle of processing in the step "H". For example, if the frequency of a phase reference signal (b) is 180 Hz, a predetermined value L stored in advance in, for example, the ROM 22 is set in the reference counter 26 at the rate of one per three reference phase periods. If the reference phase period is not exactly one-third of the period of a vertical synchronizing signal (a), the value of the reference counter 26 stored in a register R11 within the RAM 23 at the time of an interruption of the vertical synchronizing signal does not coincide with the value L to be set in the reference counter 26. For example, as shown in FIG. 19, if L>R11 at the time of the interruption of the vertical synchronizing signal, it means that a set reference phase period T is greater than one-third of the period of the vertical synchronizing signal. Thus, in such a case, every time the interruption of the vertical synchronizing signal occurs, the reference phase period T is decreased. When R11>L is achieved, the change of the reference phase period T is stopped. On the other hand, if R11>L at the time of the interruption of the vertical synchronizing signal, it means that the set reference phase period T is smaller than one-third of the period of the vertical synchronizing signal. Thus, in such a case, every time the interruption of the vertical synchronizing signal occurs, the reference phase period T is increased. When R11<L is achieved, the change of the reference phase period T is stopped. Specific processing in the step "H" will be described later. By such an operation, the reference phase period T coincides with one-i-th of the period of the vertical synchronizing signal within a range of a quantization error (1 μsec.), so that incoincidence of the reference phase periods can be substantially prevented.

Description is now made on the principle of processing in the step "I". As described above, at the time of reproduction in the VTR, the phase of the cylinder motor is controlled in synchronization with the period of an overflow of the reference counter 26. On the other hand, at the time of recording, the phase of the cylinder motor must be controlled such that the rotational phase of the head and the phase of the vertical synchronizing signal in the video signal to be recorded have a predetermined relation. As described above, this predetermined phase relation is generally determined by a standard. Particularly, in a so-called 8 mm VTR of an NTSC system, the phase difference between a head switching signal (RFSW) associated with the rotational phase of the head and the vertical synchronizing signal is set to 6H+1.5H.

Figure 20:
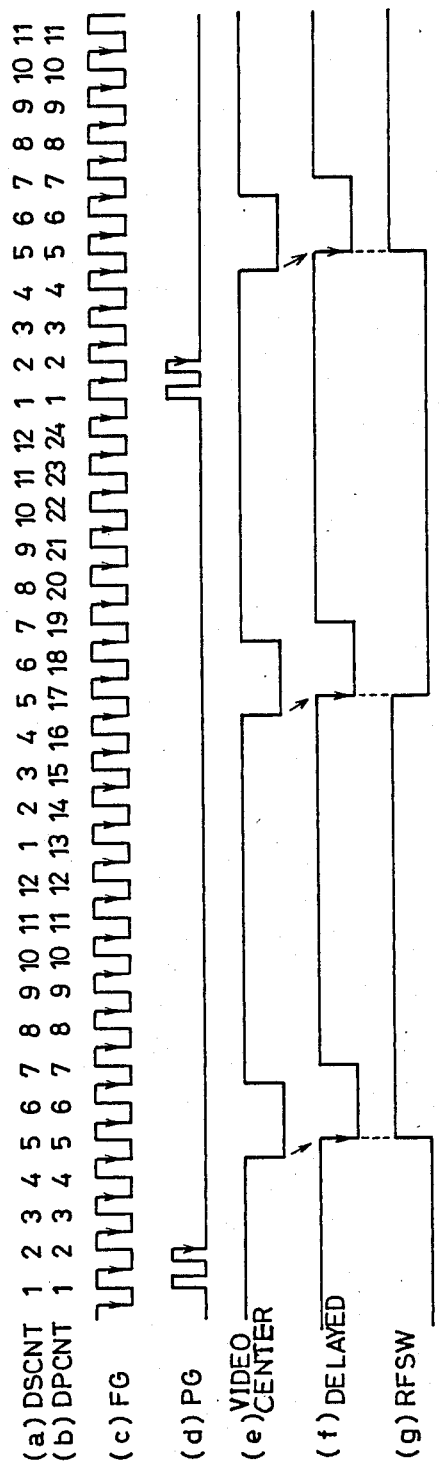

Description is now made on generation of the RFSW signal according to the present embodiment. FIG. 20 is a waveform diagram for explaining generation of the RFSW signal. As described above, 24 FG pulses (c) are generated per one rotation of the cylinder motor and one PG pulse (d) is also generated per one rotation from the cylinder motor. The phase of the PG signal (pulse) and the phase of a rotary head, that is, the phase of the cylinder motor have a predetermined relation. In FIG. 20, numbers 1 to 12 and 1 to 24 are given to the FG pulses based on timing for generation of the PG signal. More specifically, an operation of increasing a value of a particular register (DSCNT) by 1 up to 12 by interrupt processing performed by detecting the respective falls of the FG pulses, and returning the value to 1 when the value attains 12 is repeated (FIG. 20(a)). In addition, with respect to another register (DPCNT), an operation of returning a value thereof to 1 when the value attains 24 is repeated (FIG. 20(b)). By interrupt processing performed by detecting the fall of the PG pulse, the values of the registers (DSCNT and DPCNT) are set to 2.

A video center adjusting pulse (e) which is at an "L" level when the value of the register DSCNT is 5 or 6 is outputted from the microcomputer 20 through the input/output port 35 (in FIG. 4) and delayed by a delay circuit 36 and then, inputted again to the microcomputer 20.

Edges of an RFSW signal (g) are formed in response to timing for the fall of the delayed video center adjusting pulse (f). The edges of the RFSW signal are changed in a direction of the rise when the value (b) of the register DNCNT is less than 12 and in a direction of the fall when the value (b) is greater than 12. The delay time of the delay circuit 36 is variable (in a range of 180 $\mu$sec. to 960 $\mu$sec.), so that a video center can be adjusted to a standard. In addition, since the edges of the RFSW signal 180° out of phase with each other are generated at timing based on predetermined values (5 and 6) of the register DSCNT, duty adjustment of the RFSW signal is not required.

As can be seen from FIG. 20, edges of the RFSW signal exist between the values 5 and 6 of the register DSCNT. With respect to an operation for generating the phase error signal of the cylinder motor at the time of recording, a phase error signal generated by the same method as the method at the time of reproduction according to the above described first embodiment is outputted only if the edges of the RFSW signal and the vertical synchronizing signal in the signal to be recorded have the above described predetermined phase relation, that is, the vertical synchronizing signal is inputted to the microcomputer 20 when the value of the register DSCNT is 5 or 6.

Figure 22:
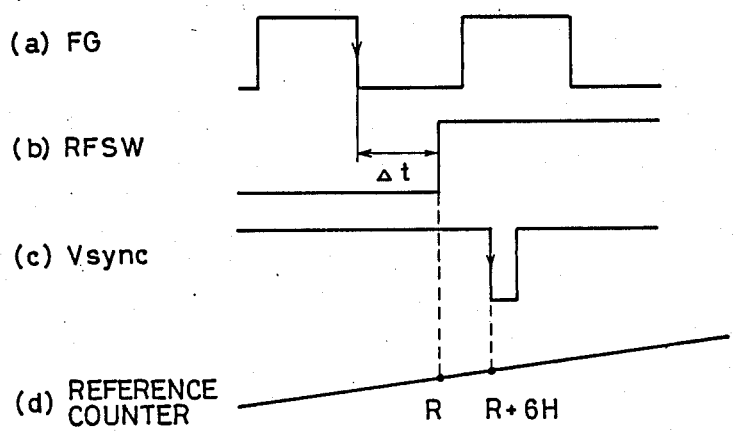

FIGS. 21 and 22 are waveform diagrams for explaining processes for establishing a predetermined phase relation between the RFSW signal and the vertical synchronizing signal in the video signal to be recorded. In FIG. 21, if the value of the register DSCNT is 1 to 4 when a vertical synchronizing signal $V_{SYNC}$(b) is inputted to the microcomputer 20, a phase error signal $D_{PH}$ (f) is at an "L" level. When the value thereof is 7 to 12, the phase error signal $D_{PH}$(f) is at an "H" level. Consequently, phase control can be performed while holding the vertical synchronizing signal and an RFSW signal (a) in a predetermined phase relation. FIG. 21(d) shows the value of the reference counter 26 and FIG. 21(e) shows generation of the phase error signal $D_{PH}$ at the time of reproduction.

Referring to FIGS. 21 and 22, description is made on an operation for automatically adjusting to 6H the phase difference between the vertical synchronizing signal and the RFSW signal.

With reference to the step "H", the predetermined value L is preset in the reference counter 26 by interrupt processing of the vertical synchronizing signal, so as to synchronize timing of the overflow of the reference counter 26 with the vertical synchronizing signal, as described above. Meanwhile, the phase relation between the FG signal used for phase control and the RFSW signal differs every VTR set, so that the numeric value L set in the reference counter 26 must be changed every set. The phase difference between the vertical synchronizing signal and the RFSW signal can be set to 6H by determining the predetermined value L as follows:

More specifically, in FIG. 22, a value R of the reference counter 26 (d) is stored by interrupt processing at timing of an edge of an RFSW signal (b) in a phase locked state. Data corresponding to (R+6H) is set in the reference counter 26 at timing of a vertical synchronizing signal (c) generated immediately after that. By such an operation, the reference counter 26 performs a counting operation such that the phase difference between the vertical synchronizing signal (c) and the RFSW signal (b) is 6H.

However, only by such an operation, when rotation of the cylinder motor is changed, data to be set in the reference counter 26 differs every time, so that a phase servo is unstable. Consequently, in practice, the following control is performed.

Figure 23:
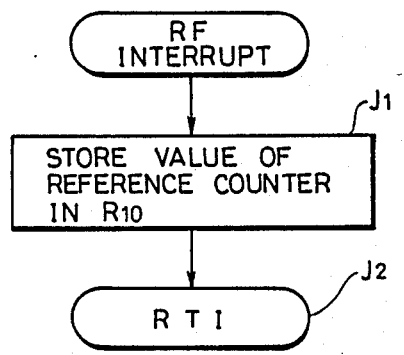
FIG. 23 is a flowchart showing interrupt processing by a head switching signal.

Referring now to FIG. 23, when an edge of the RFSW signal (in practice, a video center adjusting pulse) is inputted to the microcomputer 20, RF interrupt processing is performed, so that the value of the reference counter 26 at that timing is stored in a register R10 within the RAM 23 (in the step J1) and then, the microcomputer 20 is returned from the interruption (in the step J2).

Subsequently to the RF interrupt processing, when the vertical synchronizing signal is applied to the microcomputer 20, interrupt processing in the steps "H" and "I" shown in FIG. 18 is performed.

Figure 24:
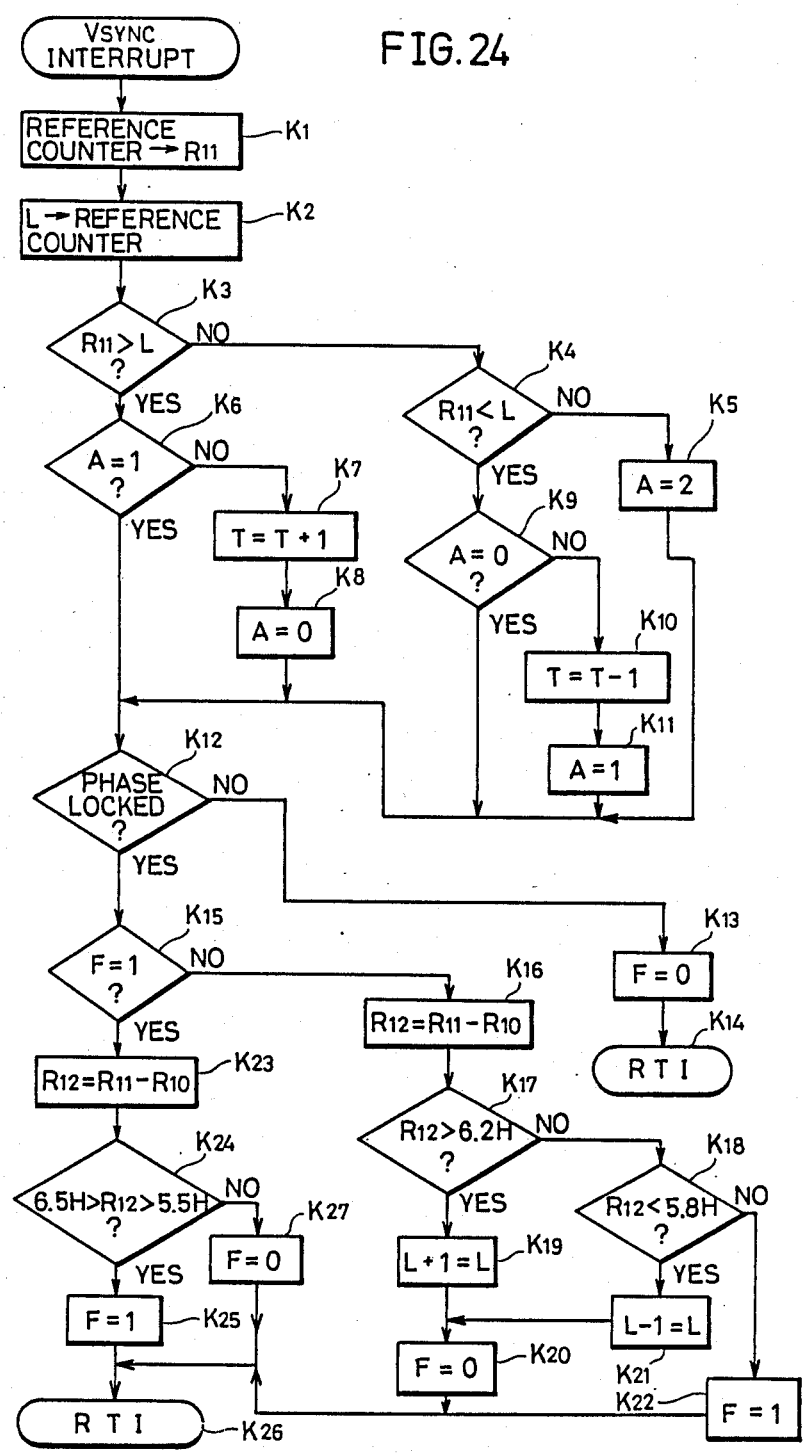
FIG. 24 is a flowchart for explaining in detail interrupt processing by a vertical synchronizing signal according to a second embodiment of the present invention.

FIG. 24 is a flowchart for explaining in more detail the interrupt processing by the vertical synchronizing signal shown in FIG. 18. Referring to FIG. 24, when the vertical synchronizing signal in the video signal to be recorded is inputted to the CPU 21 through the terminal 32 of the microcomputer 20, the value of the reference counter 26 is stored in a register R11 within the RAM 23 at timing of the vertical synchronizing signal (in the step K1). A numeric value L stored in advance in the ROM 22 is set in the reference counter 26 (in the step K2) and then, the value L and a value of the register R11 are compared with each other (in the steps K3 and K4). If both are equal to each other, "2" is set in a register A within the RAM 23 (in the step K5). Also, "2" is set in the register A when a power supply is turned on.

If the value of the register R11 is greater than the numeric value L, it is examined whether or not a value of the register A is "1" (in the step K6). If the value is "1", the program proceeds to the next processing. On the other hand, unless the value is "1", "1" is added to data T indicating a reference phase period (in the step K7) and "0" is set in the register A (in the step K8) and then, the program proceeds to the next processing.

Furthermore, if the value of the register R11 is less than the numeric value L, it is examined whether or not the value of the register A is "0" (in the step K9). If the value is "0", the program proceeds to the next processing. On the other hand, unless the value is "0", "1" is subtracted from the data T indicating the reference phase period (in the step K10) and "1" is set in the register A (in the step K11) and then, the program proceeds to the next processing.

Then, it is examined whether or not the cylinder motor is in the phase locked state (in the step K12). Unless the cylinder motor is in the phase locked state, a flag F is set to "0" (in the step K13) and then, the microcomputer 20 is returned from an interruption (in the step K14). Meanwhile, in the step K12, it is determined that the cylinder motor is in the phase locked state if the phase error signal (or data indicating the phase difference) maintains a value in a predetermined range during a predetermined time period (for example, 100 cycles of the FG signal).

On the other hand, if the cylinder motor is in the phase locked state, it is examined whether or not the flag F is "1" (in the step K15). Unless the flag F is "1", a value stored in the register R10 at the time of an RF interruption is subtracted from the value of the register R11 (in the step K16) and the result is stored in a register R12 within the RAM 23. Thus, the value is data indicating the phase difference between an edge of RFSW signal and the vertical synchronizing signal. It is examined whether or not the value of the register R12 is in a range of 6H±0.2H (in the steps K17 and K18).

As a result, if the value of the register R12 is greater than 6.2H (in the step K17), a numeric value obtained by adding a predetermined value "1" to the above described constant value L is set to new "L" (in the step K19) and the flag F is set to "0" (in the step K20) and then, the microcomputer 20 is returned from the interruption.

In addition, if the value of the register R12 is less than 5.8H (in the step K18), a numeric value obtained by subtracting the predetermined value "1" from the above described constant value L is set to new "L" (in the step K21) and the flag F is set to "0" (in the step K20) and then, the microcomputer 20 is returned from the interruption.

Furthermore, if the value of the register 12 is in the range of 6H±0.2H, the flag F is set to "1" (in the step K22) and then, the microcomputer 20 is returned from the interruption.

More specifically, processing is performed in which the numeric value L to be set in the reference counter 26 is gradually changed at timing of the vertical synchronizing signal until the phase difference between the RFSW signal and the vertical synchronizing signal is within the range of 6H±0.2H. Once the phase difference is captured within the above described range, the flag F is "1" in the step K22). Consequently, "L" will not be changed.

Once the phase difference is captured in the above described range, data indicating the phase difference at that time is calculated and stored in the register R12 (in the step K23) and then, it is examined whether not the phase difference is in a range of 6H±0.5H (in the step K24). As a result, if the phase difference is in the above described range, the flag F remains "1" (in the step K25) and then, the microcomputer 20 is returned from the interruption (in the step K26). On the other hand, if the phase difference is out of the above described range, the flag F is set to "0" (in the step K27) and then, the microcomputer 20 is returned from interruption (in the step K26). Consequently, an operation for changing the set value L is substantially started in response to the next interruption of the vertical synchronizing signal.

Since it is necessary to establish hysteresis characteristics, the operation for changing phase difference comprises two-stage processing for checking conditions of "6H±0.2H" are "6H±0.5H" as described above.

More specifically, by the above described operation, the phase difference between the RFSW signal and the vertical synchronizing signal is maintained in the range of 6H±0.5H. It is necessary that the respective most suitable values of the amounts of change of the numeric values L and T according to the present embodiment are selected by an experiment or the like. For example, the values may be other than "1".

Although the first and second embodiments are described separately in the foregoing, if both of the first and second embodiments are implemented in a single digital servo system, very stable and reliable servo control can be performed.

These objects and other objects, features, aspects and advantages of the present invention will become more apparent from the following detailed description of the present invention when taken in conjunction with the accompanying drawings.

What is claimed is:

1. A digital servo system comprising:
   a rotary body;
   means for driving rotation of said rotary body,
   means for supplying a detection signal associated with rotational speed and/or rotational phase of said rotary body,
   digital circuit means comprising:
     means responsive to said detection signal for generating a digital phase error signal associated with the rotational phase and having a first conversion gain,
     means responsive to said detection signal for generating a digital speed error signal associated with the rotational speed of said rotary body and having a second conversion gain,
     means for digitally adding said digital phase error signal and said digital speed error signal to each other to generate a digital error signal,
     means for digitally amplifying said generated digital error signal to form an amplified digital error signal,
   means for applying said amplified digital error signal to said rotation driving means, and
   wherein the first and second conversion gains are both sufficiently low such that the servo system possesses relatively large pre-defined capture ranges correspondingly associated with the digital phase error signal and the digital speed error signal.

2. A digital servo system according to claim 1, wherein said adding means comprises means for determining an addition ratio of said digital phase error signal to said digital speed error signal.

3. A digital servo system according to claim 2, wherein said addition ratio determining means comprises means for dividing at least one signal of said digital phase error signal and said digital speed error signal by extracting arbitrary higher order bits of at said one signal.

4. A digital servo system according to claim 1, wherein said amplifying means comprises means for extracting arbitrary lower order bits of said generated digital error signal.

5. A digital servo system according to claim 1, wherein said applying means comprises means for converting said digital error signal into an analogue error signal.

6. A digital servo system according to claim 1, which further comprises
 a first timer counter to be reset in response to said detection signal, and
 a second timer counter having a variable overflow period.

7. A digital servo system according to claim 6, which further comprises input capture register means for immediately storing a value of said first timer counter at timing of said detection signal.

8. A digital servo system according to claim 7, wherein said digital speed error signal generating means comprises
 means responsive to the value stored in said input capture register and a value of said first timer counter at the time of resetting said first timer counter for calculating a period $T_{FG}$ of said detection signal, and
 means responsive to said calculated period $T_{FG}$ of the detection signal, a predetermined speed bias period $T_{DS}$ and a predetermined lock range $T_{SS}$ for determining the amplitude of an n-bit digital speed error signal $D_{SP}$ (n:a positive integer).

9. A digital servo system according to claim 8, wherein said amplitude determining means generates a signal $D_{SP}$ as follows:

$D = 0$ when $T_{FG} < T_{DS}$, $D_{SP} = (2^n - 1)$ when $T_{FG} > T_{DS} + T_{SS}$, and $D_{SP} = (T_{FG} - T_{DS})/T_{SS} \times (2^n - 1)$ when $T_{DS} + T_{SS} \geq T_{FG} \geq T_{DS}$.

10. A digital servo system according to claim 7, wherein said digital phase error signal generating means comprises
 means responsive to the value stored in said input capture register means and values of said first and second timer counters at the time of resetting said first timer counter for calculating data $T_P$ indicating a phase difference between said detection signal and timing for resetting said second timer counter, and
 means responsive to said calculated data $T_P$ indicating the phase difference, a predetermined phase bias period $T_{DP}$ and a predetermined lock range $T_{SP}$ for determining the amplitude of an n-bit digital phase error signal $D_{PH}$ (n:a positive integer).

11. A digital servo system according to claim 10, wherein said amplitude determining means generates a signal $D_{PH}$ as follows:

$D_{PH} = 0$ when $T_P < T_{DP}$, $D_{PH} = (2^n - 1)$ when $T_P > T_{DP} + T_{SP}$, and $D_{PH} = (T_P - T_{DP})/T_{SP} \times (2^n - 1)$ when $T_{DP} + T_{SP} \geq T_P \geq T_{DP}$.

12. A digital servo system according to claim 10, which further comprises means for restraining the width of change of the digital phase error signal at a predetermined value $v_0$ when the difference between successively occurring digital phase error signals $D_{PH}$ exceeds said predetermined value $v_0$.

13. A digital servo system according to claim 12, said restraining means comprises
 means for comparing a value obtained by adding said predetermined value $v_0$ to a phase error signal $D_{PH1}$ corresponding to the previous detection signal with a phase error signal $D_{PH2}$ corresponding to the newest detection signal and outputting a value obtained by adding said predetermined value $v_0$ to the previous phase error signal $D_{PH1}$ as a newest phase error signal $D_{PH}$ if the newest phase error signal $D_{PH2}$ s larger, and
 means for comparing a value obtained by subtracting said predetermined value $v_0$ from said phase error signal $D_{PH1}$ corresponding to the previous detection signal with said phase error signal $D_{PH2}$ corresponding to the newest detection signal and outputting a value obtained by subtracting said predetermined value $v_0$ from the previous phase error signal $D_{PH1}$ as a newest phase error signal $D_{PH}$ if the newest phase error signal $D_{PH2}$ is smaller.

14. A digital servo system according to claim 4, wherein said digital amplifying means comprises means for extracting (n−m) lower order bits as a digital error signal if values of arbitrary pre-defined m higher order bits (m:a positive integer) of said n-bit digital error signal are in a predetermined range.

15. A digital servo system according to claim 1, wherein said rotary body comprises a cylinder motor of a video tape recorder.

16. A digital servo system according to claim 1, wherein said rotary body comprises a capstan motor of a video tape recorder.

17. A digital servo system comprising,
 a rotary body,
 means for driving rotation of said rotary body,
 means for supplying a detection signal associated with rotational phase of said rotary body,
 means for supplying an external reference signal having a constant period, and
 microcomputer means responsive to said detection signal and said external reference signal for servo controlling the phase of said rotary body,
 said microcomputer means comprising
  means for generating an internal reference signal having a period T to control the rotational phase of said rotary body, said internal reference signal generating means comprising a reference counter, and
  means for controlling said internal reference signal generating means such that said internal reference signal has a predetermined period and/or a predetermined phase relation with respect to said external reference signal and wherein said controlling means controls said phase relation by setting a predetermined value L in the reference counter at the timing of the external reference signal.

18. A digital servo system according to claim 17, wherein the reference counter has a variable timing period.

19. A digital servo system according to claim 18, wherein said controlling means comprises means for setting the timing period of said reference counter corresponding to the period of said internal reference signal to a period of one-i-th (i:an integer) of a period of said external reference signal.

20. A digital servo system according to claim 19, wherein said controlling means comprises
  means for storing a value R of said reference counter at timing of said external reference signal,
  means for setting the predetermined value L in said reference counter at timing of said external reference signal,
  means for comparing said stored value R with said predetermined value L,
  means responsive to the result of comparison by said comparing means for gradually changing the period T of said internal reference signal by a constant amount in a direction in which said value R approaches said predetermined value L,
  and means for stopping the change of the period T of said internal reference signal if said value R is equal to said predetermined value L.

21. A digital servo system according to claim 19, wherein
  said rotary body comprises a cylinder motor of a video tape recorder for driving a rotary head, and
  said external reference signal is a vertical synchronizing signal in a video signal to be recorded.

22. A digital servo system according to claim 18, wherein
  said microcomputer means further comprises means responsive to said detection signal and said internal reference signal for generating a phase error signal and for applying the phase error signal to said driving means, and
  said controlling means comprises means for changing a set value of said reference counter such that a signal associated with said detection signal and external reference signal have a predetermined phase relation.

23. A digital servo system according to claim 22, wherein said setting means comprises
  means for storing a value $R_1$ of said reference counter at timing of the signal associated with said detection signal,
  means for storing a value $R_2$ of said reference counter at timing of said external reference signal,
  means for setting the predetermined value L in said reference counter at timing of said external reference signal,
  means for obtaining the difference between said stored values $R_1$ and $R_2$,
  means for determining whether or not the difference between said values $R_1$ and $R_2$ satisfies said predetermined phase relation,
  means for gradually changing, by a constant amount, the predetermined value L to be preset in said reference counter until the difference between said values $R_1$ and $R_2$ satisfies said predetermined phase relation when the difference therebetween does not satisfy said predetermined phase relation, and
  means for stopping the change of said predetermined value L if the difference between said values $R_1$ and $R_2$ satisfies said predetermined phase relation.

24. A digital servo system according to claim 23, wherein
  said rotary body comprises a cylinder motor of a video tape recorder for driving a rotary head, and
  said external reference signal is a vertical synchronizing signal in a video signal to be recorded.

25. A digital servo system according to claim 24, wherein said signal associated with said detection signal is a switching signal for said rotary head.

26. A digital servo system comprising:
  a rotary body,
  means for driving rotation of said rotary body,
  means for supplying a detection signal associated with rotational speed and/or rotational phase of said rotary body,
  means for generating an internal reference signal having a period T for controlling the phase of said rotary body,
  means responsive to said detection signal and said internal reference signal for generating a digital phase error signal associated with the rotational phase of said rotary body,
  means responsive to said detection signal for generating a digital speed error signal having a speed bias period $T_{DS}$ and associated with the rotational speed of said rotary body,
  means for digitally adding said digital phase error signal and said digital speed error signal to each other to generate a digital error signal and for applying the digital error signal to said driving means,
  means for supplying a signal for designating a first mode for controlling the rotational speed of said rotary body while releasing phase control of said rotary body or a second mode for controlling the rotational speed of said rotary body while maintaining phase control of said rotary body,
  means for holding said digital phase error signal immediately before releasing phase control during a time period of releasing the phase control if said first mode is designated,
  means for reproducing a phase relation between said detection signal and said internal reference signal before designation of said first mode immediately after the transition to a phase controlled state occurs in response to release of designation of said first mode,
  means for gradually changing the speed bias period $T_{DS}$ of said digital speed error signal if said second mode is designated, and
  means for gradually changing the period T of said internal reference signal if said second mode is designated.

27. A digital servo system according to claim 26, wherein said means for reproducing said phase relation comprises
  means for storing a value of said reference counter at timing associated with said detection signal immediately before designation of said first mode, and
  means for presetting said stored value in said reference counter at timing associated with said detection signal immediately after release of designation of said first mode.

28. A digital servo system according to claim 26, wherein said means for changing the speed bias period $T_{DS}$ comprises
  means for setting a speed bias period $T_{DSM}$ and a predetermined amount $\Delta T_{DS}$ of change corresponding to the designated mode, means for comparing a newest speed bias period $T_{DS}$ with the set speed bias period $T_{DSM}$, means responsive to the result of comparison by said comparing means for changing, by $\Delta T_{DS}$, said speed bias period $T_{DS}$ in a direction in which the newest speed bias period $T_{DS}$ approaches the set speed bias period $T_{DSM}$, and means for stopping the change of set speed bias period $T_{DS}$ if said newest speed bias period $T_{DS}$ and the set speed bias period $T_{DSM}$ are equal.

29. A digital servo system according to claim 26, wherein said internal reference signal generating means comprises a reference counter having a variable timing period.

30. A digital servo system according to claim 29, wherein means for changing the period T of the internal reference signal comprises means for setting a period $T_M$ of the internal reference signal and a predetermined amount $\Delta T$ of change corresponding to the designated mode, means for comparing said period T of the newest internal reference signal with said set period $T_M$, means responsive to the result of comparison by said comparing means for changing, by $\Delta T$, said period T of the internal reference signal in a direction in which said newest period T of the internal reference signal approaches the set period $T_M$, and means for stopping the change of said period T of the internal reference signal if said newest period T of the internal reference signal and the set period $T_M$ are equal.

31. A digital servo system according to claim 26, wherein said rotary body comprises a cylinder motor of a video tape recorder.

* * * * *